(12) United States Patent
Zhang

(10) Patent No.: US 10,334,466 B2
(45) Date of Patent: Jun. 25, 2019

(54) NETWORK DEVICE, TERMINAL, AND METHOD FOR DETERMINING AVAILABILITY OF COMMUNICATION SPECTRUM

(71) Applicant: Huawei Technologies Co., Ltd., Shenzhen (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 15/510,611

(22) PCT Filed: Sep. 11, 2014

(86) PCT No.: PCT/CN2014/086297
§ 371 (c)(1),
(2) Date: Mar. 10, 2017

(87) PCT Pub. No.: WO2016/037340
PCT Pub. Date: Mar. 17, 2016

(65) Prior Publication Data
US 2018/0234868 A1    Aug. 16, 2018

(51) Int. Cl.
*H04W 24/10* (2009.01)
*H04W 16/14* (2009.01)
*H04B 17/309* (2015.01)

(52) U.S. Cl.
CPC .......... *H04W 24/10* (2013.01); *H04B 17/309* (2015.01); *H04W 16/14* (2013.01)

(58) Field of Classification Search
CPC .............................. H04W 24/10; H04W 16/14
See application file for complete search history.

(56) References Cited

U.S. PATENT DOCUMENTS

2008/0298450 A1* 12/2008 Zhang ................ H04L 1/0006
                                                        375/227
2009/0161610 A1*  6/2009 Kang ................. H04B 1/715
                                                        370/329

(Continued)

FOREIGN PATENT DOCUMENTS

CN         102624465 A      8/2012
CN         103138846 A      6/2013

(Continued)

OTHER PUBLICATIONS

Wu et al., "IEEE 802.11 Distributed Coordination Function (DCF): Analysis and Enhancement," IEEE International Conference on Communications, pp. 605-609, Institute of Electrical and Electronics Engineers, New York, New York, (2002).

(Continued)

*Primary Examiner* — Gary Mui
(74) *Attorney, Agent, or Firm* — Leydig, Voit & Mayer, Ltd.

(57) ABSTRACT

A network device includes: a transceiving module, configured to: send control information to a target terminal to instruct the target terminal to measure a first spectrum, where the first spectrum is an unlicensed spectrum for the network device; and receive feedback information that is reported by the target terminal and obtained by measuring the first spectrum; and a processing module, configured to determine, according to the feedback information received by the transceiving module, whether the first spectrum is free.

24 Claims, 4 Drawing Sheets

(56) References Cited

U.S. PATENT DOCUMENTS

| | | | |
|---|---|---|---|
| 2013/0155991 A1* | 6/2013 | Kazmi | H04W 72/0453 370/329 |
| 2013/0310062 A1 | 11/2013 | Liu et al. | |
| 2014/0036818 A1* | 2/2014 | Koskela | H04W 72/1231 370/329 |
| 2015/0237504 A1 | 8/2015 | Xie | |
| 2017/0094550 A1* | 3/2017 | Shi | H04W 24/10 |
| 2017/0156075 A1* | 6/2017 | Harada | H04W 24/10 |
| 2017/0272957 A1* | 9/2017 | Xu | H04W 74/0816 |
| 2018/0175975 A1* | 6/2018 | Um | H04L 1/1816 |

FOREIGN PATENT DOCUMENTS

| | | | |
|---|---|---|---|
| CN | 103813342 A | | 5/2014 |
| WO | 2011132837 A1 | | 10/2011 |
| WO | WO 2012151996 A1 | | 11/2012 |
| WO | 2013059999 A1 | | 5/2013 |
| WO | 2013143053 A1 | | 10/2013 |

OTHER PUBLICATIONS

"$3^{rd}$ Generation Partnership Project; Technical Specification Group Radio Access Network; Evolved Universal Terrestrial Radio Access (E-UTRA); Physical layer; Measurements (Release 11)," 3GPP TS 36.214, V11.1.0, pp. 1-14, $3^{rd}$ Generation Partnership Project, Valbonne, France, (Dec. 2012).

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300, V12.2.0, pp. 1-215, $3^{rd}$ Generation Partnership Project, Valbonne France, (Jun. 2014).

"$3^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.2.0, pp. 1-365, $3^{rd}$ Generation Partnership Project, Valbonne, France, (Jun. 2014).

* cited by examiner

NETWORK DEVICE, TERMINAL, AND METHOD FOR DETERMINING AVAILABILITY OF COMMUNICATION SPECTRUM

TECHNICAL FIELD

The present invention relates to the field of wireless communications technologies, and in particular, to a network device, a terminal, and a method for determining availability of a communication spectrum.

BACKGROUND

A Wireless Fidelity (Wireless Fidelity, Wifi) system uses an unlicensed spectrum (unlicensed spectrum), and a Long Term Evolution (Long Term Evolution, LTE) system uses licensed 800 M, second-generation (2nd Generation, 2G), and 3.5-generation (3.5 Generation, 3.5G) spectrums.

Considering that licensed spectrum resources used in the LTE are limited, an existing technology is that, when a Wi-Fi system does not effectively use its spectrum, an LTE system perceives usage of the spectrum of the Wi-Fi system and uses the spectrum. This technology is referred to as an unlicensed LTE (unlicensed LTE, U-LTE) technology.

When an LTE base station fails to effectively perceive a surrounding Wi-Fi access point (Access Point, AP), a hidden terminal problem (hidden terminal problem, HTP) may be caused. Details are shown in FIG. 1.

In FIG. 1, because a signal loss during penetration is relatively large, an outdoor LTE base station fails to detect a signal transmitted by an indoor Wi-Fi AP. The LTE base station communicates with user equipment (User Equipment, UE). However, UE 2 is close to the Wi-Fi AP. Consequently, a downlink signal transmitted by the Wi-Fi AP causes interference to communication between the LTE base station and the UE 2, affecting the communication between the LTE base station and the UE 2.

In conclusion, when a network device fails to effectively perceive another network device, but uses a communication spectrum of the another network device to communicate with a terminal, the communication between the network device and the terminal may be interfered with by the another network device.

SUMMARY

Embodiments of the present invention provide a network device, a terminal, and a method for determining availability of a communication spectrum, so as to resolve the following problem: When a network device fails to effectively perceive another network device, but uses a communication spectrum of the another network device to communicate with a terminal, the communication between the network device and the terminal may be interfered with by the another network device.

According to a first aspect, the embodiments of the present invention provide a first network device, including:

a transceiving module, configured to: send control information to a target terminal, where the control information is used for instructing the target terminal to measure a first spectrum, and the first spectrum is an unlicensed spectrum for the first network device; and receive feedback information reported by the target terminal, where the feedback information is obtained by the target terminal by measuring the first spectrum; and a processing module, configured to determine, according to the feedback information received by the transceiving module, whether the first spectrum is available.

With reference to the first aspect, in a first possible implementation manner, the control information includes configuration information and activation information, the configuration information includes measurement configuration information required by the target terminal for measuring the first spectrum, and the activation information is used for instructing the target terminal to perform measurement according to the configuration information; and the transceiving module is specifically configured to: after sending the configuration information to the target terminal, send the activation information to the target terminal when the target terminal is required to measure the first spectrum; or the control information includes the configuration information; and the transceiving module is specifically configured to send the configuration information to the target terminal when the target terminal is required to measure the first spectrum, so as to instruct the target terminal to perform measurement according to the configuration information.

With reference to the first possible implementation manner of the first aspect, in a second possible implementation manner, the configuration information further includes feedback information reporting condition information, and the feedback information reporting condition information is used for instructing the target terminal to report the feedback information when a condition indicated by the feedback information reporting condition information is met.

With reference to the first possible implementation manner of the first aspect, in a third possible implementation manner, if the control information includes the configuration information and the activation information, the transceiving module is further configured to:

after sending the activation information, send deactivation information to the target terminal when the target terminal is required to stop measuring the first spectrum, so as to instruct the target terminal to stop measuring the first spectrum.

With reference to the first possible implementation manner of the first aspect, in a fourth possible implementation manner, if the control information includes the configuration information and the activation information, the transceiving module is further configured to send a first receiving threshold to the target terminal before sending the activation information, where the first receiving threshold is used for instructing the target terminal to receive the activation information when the following condition is met: a difference between a strength of a signal that is transmitted by the first network device and received by the target terminal and a strength of a signal that is transmitted by another network device and received on the first spectrum is less than the first receiving threshold; or if the control information includes the configuration information, the transceiving module is further configured to send a second receiving threshold to the target terminal before sending the configuration information, where the second receiving threshold is used for instructing the target terminal to receive the configuration information when the following condition is met: a difference between a strength of a signal that is transmitted by the first network device and received by the target terminal and a strength of a signal that is transmitted by another network device and received on the first spectrum is less than the second receiving threshold.

With reference to the first possible implementation manner of the first aspect, in a fifth possible implementation manner, the transceiving module is further configured to identify the control information by using a first identifier of the target terminal, where the first identifier is used to indicate, to the target terminal, that the control information is sent to the target terminal, and instruct the target terminal to measure the first spectrum, so that the first network device determines whether the first spectrum is available.

With reference to the fifth possible implementation manner of the first aspect, in a sixth possible implementation manner, if the control information includes the configuration information and the activation information, the transceiving module is specifically configured to send the activation information on a physical downlink control channel, and scramble cyclic redundancy check CRC information of the activation information by using the first identifier of the target terminal.

With reference to the fifth possible implementation manner of the first aspect, in a seventh possible implementation manner, if the control information includes the configuration information, the transceiving module is specifically configured to send the configuration information on a physical downlink control channel, and scramble CRC information of the configuration information by using the first identifier of the target terminal.

With reference to the first possible implementation manner of the first aspect, in an eighth possible implementation manner, the configuration information includes:

first spectrum information that is used to indicate the first spectrum, so as to indicate the first spectrum to be measured by the target terminal.

With reference to the first possible implementation manner of the first aspect, in a ninth possible implementation manner, the configuration information includes:

feedback resource indication information that is used to indicate a spectrum resource used by the target terminal for reporting the feedback information.

With reference to the first possible implementation manner of the first aspect, in a tenth possible implementation manner, the configuration information includes a network device identifier of another network device that uses the first spectrum; and the control information is specifically used for instructing the target terminal to measure a signal transmitted on the first spectrum by the another network device identified by the network device identifier.

With reference to the first possible implementation manner of the first aspect, in an eleventh possible implementation manner, the feedback information includes:

a measurement result obtained by the target terminal by measuring the first spectrum.

With reference to the first possible implementation manner of the first aspect, in a twelfth possible implementation manner, the feedback information includes:

first indication information that is used to indicate whether the first spectrum is available, where the first indication information is determined by the target terminal according to a measurement result obtained by measuring the first spectrum.

With reference to the twelfth possible implementation manner of the first aspect, in a thirteenth possible implementation manner, the configuration information further includes a first measurement threshold; and the first indication information is determined by the target terminal according to the first measurement threshold and the measurement result that is obtained by the target terminal by measuring the first spectrum.

With reference to the first possible implementation manner of the first aspect, in a fourteenth possible implementation manner, the control information is specifically used for instructing the target terminal to measure the first spectrum and a second spectrum that is being used by the first network device; and the configuration information further includes measurement configuration information required by the target terminal for measuring the second spectrum, where the second spectrum is a licensed spectrum for the first network device.

With reference to the fourteenth possible implementation manner of the first aspect, in a fifteenth possible implementation manner, the configuration information includes:

second spectrum information that is used to indicate the second spectrum, so as to indicate the second spectrum to be measured by the target terminal.

With reference to the fourteenth possible implementation manner of the first aspect, in a sixteenth possible implementation manner, the feedback information includes:

a first measurement result and a second measurement result, where the first measurement result is a measurement result obtained by the target terminal by measuring the first spectrum, and the second measurement result is a measurement result obtained by the target terminal by measuring the second spectrum.

With reference to the sixteenth possible implementation manner of the first aspect, in a seventeenth possible implementation manner, the feedback information further includes second indication information that is used to indicate that the first measurement result is for the first spectrum; and the processing module is specifically configured to:

determine the first measurement result and/or the second measurement result from the feedback information according to the second indication information; and determine, according to the first measurement result and the second measurement result, whether the first spectrum is available.

With reference to the sixteenth possible implementation manner of the first aspect, in an eighteenth possible implementation manner, the feedback information further includes third indication information that is used to indicate that the second measurement result is for the second spectrum; and the processing module is specifically configured to:

determine the second measurement result and/or the first measurement result from the feedback information according to the third indication information; and determine, according to the first measurement result and the second measurement result, whether the first spectrum is available.

With reference to the fourteenth possible implementation manner of the first aspect, in a nineteenth possible implementation manner, the feedback information includes:

a result of comparing a first measurement result and a second measurement result, where the first measurement result is a measurement result obtained by the target terminal by measuring the first spectrum, and the second measurement result is a measurement result obtained by the target terminal by measuring the second spectrum.

With reference to the nineteenth possible implementation manner of the first aspect, in a twentieth possible implementation manner, the feedback information further includes:

fourth indication information that is used to indicate that the feedback information includes the comparison result; and the processing module is specifically configured to:

determine, according to the fourth indication information, that the feedback information includes the comparison result; and determine, according to the comparison result, whether the first spectrum is available.

With reference to the fourteenth possible implementation manner of the first aspect, in a twenty-first possible implementation manner, the feedback information includes:

fifth indication information that is used to indicate whether the first spectrum is available, where the fifth indication information is determined by the target terminal according to a first measurement result and a second measurement result, the first measurement result is a measurement result obtained by the target terminal by measuring the first spectrum, and the second measurement result is a measurement result obtained by the target terminal by measuring the second spectrum.

With reference to the twenty-first possible implementation manner of the first aspect, in a twenty-second possible implementation manner, the configuration information further includes a second measurement threshold; and the fifth indication information is determined by the target terminal according to the second measurement threshold, the first measurement result, and the second measurement result.

With reference to the eleventh possible implementation manner of the first aspect, the twelfth possible implementation manner of the first aspect, the thirteenth possible implementation manner of the first aspect, the sixteenth possible implementation manner of the first aspect, the seventeenth possible implementation manner of the first aspect, the eighteenth possible implementation manner of the first aspect, the nineteenth possible implementation manner of the first aspect, the twentieth possible implementation manner of the first aspect, the twenty-first possible implementation manner of the first aspect, or the twenty-second possible implementation manner of the first aspect, in a twenty-third possible implementation manner, the measurement result includes one of the following information:

received signal strength information;

received signal energy information; or received signal quality information.

With reference to any one of the first aspect or the first possible implementation manner of the first aspect to the twenty-third possible implementation manner of the first aspect, in a twenty-fourth possible implementation manner of the first aspect, the feedback information includes:

time information that is used to indicate available time of the first spectrum.

With reference to the twenty-fourth possible implementation manner of the first aspect, in a twenty-fifth possible implementation manner, the time information includes:

a start moment T1 when the first spectrum becomes available, available duration D1 that starts from the start moment T1 and during which the first spectrum is available, and unavailable duration D2 that starts at the end of the available duration D1 and during which the first spectrum is unavailable; and the processing module is specifically configured to:

determine that the first spectrum is available since the start moment T1 and during the duration D1 at a period of D1+D2, and the first spectrum is unavailable during the duration D2 after the duration D1.

With reference to any one of the first aspect or the first possible implementation manner of the first aspect to the twenty-fifth possible implementation manner of the first aspect, in a twenty-sixth possible implementation manner, the feedback information includes:

frequency information that is used to indicate an available frequency of the first spectrum.

With reference to the twenty-sixth possible implementation manner of the first aspect, in a twenty-seventh possible implementation manner, the frequency information includes:

a carrier identifier of an available carrier in the first spectrum; or a carrier bitmap, where the carrier bitmap is used to indicate whether carriers in the first spectrum are available.

With reference to any one of the first aspect or the first possible implementation manner of the first aspect to the twenty-seventh possible implementation manner of the first aspect, in a twenty-eighth possible implementation manner, the transceiving module is specifically configured to:

receive the feedback information from a physical uplink control channel or a physical uplink shared channel.

According to a second aspect, the embodiments of the present invention provide a terminal, including:

a transceiving module, configured to receive control information sent by a first network device, where the control information is used for instructing the terminal to measure a first spectrum; and a processing module, configured to measure the first spectrum according to the control information, so as to obtain feedback information; where the transceiving module is further configured to report the obtained feedback information to the first network device, where the feedback information is used for instructing the first network device to determine, according to the feedback information, whether the first spectrum is available, where the first spectrum is an unlicensed spectrum for the first network device.

With reference to the second aspect, in a first possible implementation manner, the control information includes configuration information and activation information, the configuration information includes measurement configuration information required by the terminal for measuring the first spectrum, and the activation information is used for instructing the terminal to perform measurement according to the configuration information; the transceiving module is specifically configured to: after receiving the configuration information sent by the first network device, receive the activation information sent by the first network device; and the processing module is specifically configured to measure the first spectrum according to the configuration information after receiving the activation information; or the control information includes the configuration information; the transceiving module is specifically configured to receive the configuration information sent by the first network device; and the processing module is specifically configured to measure the first spectrum according to the configuration information after receiving the configuration information.

With reference to the first possible implementation manner of the second aspect, in a second possible implementation manner, the configuration information further includes feedback information reporting condition information, and the transceiving module is specifically configured to report the feedback information when a condition indicated by the feedback information reporting condition information is met.

With reference to the first possible implementation manner of the second aspect, in a third possible implementation manner, if the control information includes the configuration information and the activation information, the transceiving module is further configured to: after receiving the activation information sent by the first network device, receive deactivation information sent by the first network device; and the processing module is further configured to stop, according to the deactivation information, measuring the first spectrum.

With reference to the first possible implementation manner of the second aspect, in a fourth possible implementation manner, if the control information includes the configuration information and the activation information, the transceiving module is further configured to: before receiving the activation information, receive a first receiving threshold sent by the first network device; and the transceiving module is specifically configured to receive the activation information when a difference between a strength of a received signal transmitted by the first network device and a strength of a signal that is transmitted by another network device and received on the first spectrum is less than the first receiving threshold; or if the control information includes the configuration information, the transceiving module is further configured to: before receiving the configuration information, receive a second receiving threshold sent by the first network device; and the transceiving module is specifically configured to receive the configuration information when a difference between a strength of a received signal transmitted by the first network device and a strength of a signal that is transmitted by another network device and received on the first spectrum is less than the second receiving threshold.

With reference to the first possible implementation manner of the second aspect, in a fifth possible implementation manner, the transceiving module is further configured to determine that the control information is identified by using a first identifier of the terminal, where the first identifier is used to indicate, to the terminal, that the control information is sent to the terminal, and instruct the terminal to measure the first spectrum, so that the first network device determines whether the first spectrum is available.

With reference to the fifth possible implementation manner of the second aspect, in a sixth possible implementation manner, if the control information includes the configuration information and the activation information, the transceiving module is specifically configured to receive the activation information on a physical downlink control channel, descramble cyclic redundancy check CRC of the activation information by using the first identifier of the terminal, and if descrambling is successful, determine that the activation information is identified by using the first identifier of the terminal.

With reference to the fifth possible implementation manner of the second aspect, in a seventh possible implementation manner, if the control information includes the configuration information, the transceiving module is specifically configured to receive the configuration information on a physical downlink control channel, descramble CRC of the configuration information by using the first identifier of the terminal, and if descrambling is successful, determine that the configuration information is identified by using the first identifier of the terminal.

With reference to the first possible implementation manner of the second aspect, in an eighth possible implementation manner, the configuration information includes first spectrum information that is used to indicate the first spectrum; and the processing module is specifically configured to measure the first spectrum indicated by the first spectrum information, so as to obtain the feedback information.

With reference to the first possible implementation manner of the second aspect, in a ninth possible implementation manner, the configuration information includes:

feedback resource indication information that is used to indicate a spectrum resource used by the terminal for reporting the feedback information; and the transceiving module is specifically configured to report the feedback information on the spectrum resource indicated by the feedback resource indication information.

With reference to the first possible implementation manner of the second aspect, in a tenth possible implementation manner, the configuration information includes a network device identifier of another network device that uses the first spectrum; and the processing module is specifically configured to measure a signal transmitted on the first spectrum by the another network device identified by the network device identifier, so as to obtain the feedback information.

With reference to the first possible implementation manner of the second aspect, in an eleventh possible implementation manner, the feedback information includes: a measurement result obtained by the processing module by measuring the first spectrum.

With reference to the first possible implementation manner of the second aspect, in a twelfth possible implementation manner, the feedback information includes first indication information that is used to indicate whether the first spectrum is available; and the processing module is specifically configured to measure the first spectrum according to the configuration information, and determine the first indication information according to a measurement result obtained in the measurement.

With reference to the twelfth possible implementation manner of the second aspect, in a thirteenth possible implementation manner, the control information further includes a first measurement threshold; and the processing module is specifically configured to measure the first spectrum according to the configuration information, and determine the first indication information according to the first measurement threshold and the measurement result that is obtained in the measurement.

With reference to the first possible implementation manner of the second aspect, in a fourteenth possible implementation manner, the control information is specifically used for instructing the terminal to measure the first spectrum and a second spectrum that is being used by the first network device;

the configuration information further includes measurement configuration information required by the processing module for measuring the second spectrum; and the processing module is specifically configured to measure the first spectrum and the second spectrum according to the configuration information, so as to obtain the feedback information, where the second spectrum is a licensed spectrum for the first network device.

With reference to the fourteenth possible implementation manner of the second aspect, in a fifteenth possible implementation manner, the configuration information includes second spectrum information that is used to indicate the second spectrum; and the processing module is specifically configured to measure the first spectrum and the second spectrum that is indicated by the second spectrum information, so as to obtain the feedback information.

With reference to the fourteenth possible implementation manner of the second aspect, in a sixteenth possible implementation manner, the feedback information includes:

a first measurement result and a second measurement result, where the first measurement result is a measurement result obtained by the processing module by measuring the first spectrum, and the second measurement result is a measurement result obtained by the processing module by measuring the second spectrum.

With reference to the sixteenth possible implementation manner of the second aspect, in a seventeenth possible implementation manner, the feedback information further includes:

second indication information that is used to indicate that the first measurement result is for the first spectrum; and/or third indication information that is used to indicate that the second measurement result is for the second spectrum.

With reference to the fourteenth possible implementation manner of the second aspect, in an eighteenth possible implementation manner, the feedback information includes:

a result of comparing a first measurement result and a second measurement result, where the first measurement result is a measurement result obtained by the processing module by measuring the first spectrum, and the second measurement result is a measurement result obtained by the processing module by measuring the second spectrum.

With reference to the eighteenth possible implementation manner of the second aspect, in a nineteenth possible implementation manner, the feedback information further includes:

fourth indication information that is used to indicate that the feedback information includes the comparison result.

With reference to the fourteenth possible implementation manner of the second aspect, in a twentieth possible implementation manner, the feedback information includes:

fifth indication information that is used to indicate whether the first spectrum is available, where the fifth indication information is determined by the processing module according to a first measurement result and a second measurement result, the first measurement result is a measurement result obtained by the processing module by measuring the first spectrum, and the second measurement result is a measurement result obtained by the processing module by measuring the second spectrum.

With reference to the twentieth possible implementation manner of the second aspect, in a twenty-first possible implementation manner, the configuration information further includes a second measurement threshold; and the fifth indication information is determined by the processing module according to the second measurement threshold, the first measurement result, and the second measurement result.

With reference to any one of the eleventh possible implementation manner to the thirteenth possible implementation manner or any one of the sixteenth possible implementation manner to the twenty-first possible implementation manner of the second aspect, in a twenty-second possible implementation manner, the measurement result includes one of the following information:

received signal strength information;

received signal energy information; or received signal quality information.

With reference to any one of the second aspect or the first possible implementation manner to the twenty-second possible implementation manner of the second aspect, in a twenty-third possible implementation manner, the feedback information includes:

time information that is used to indicate available time of the first spectrum.

With reference to the twenty-third possible implementation manner of the second aspect, in a twenty-fourth possible implementation manner, the time information includes: a start moment T1 when the first spectrum becomes available, available duration D1 that starts from the start moment T1 and during which the first spectrum is available, and unavailable duration D2 that starts at the end of the available duration D1 and during which the first spectrum is unavailable; and the first network device is instructed to determine:

the first spectrum is available since the start moment T1 and during the duration D1 at a period of D1+D2, and the first spectrum is unavailable during the duration D2 after the duration D1.

With reference to any one of the second aspect or the first possible implementation manner to the twenty-fourth possible implementation manner of the second aspect, in a twenty-fifth possible implementation manner, the feedback information includes:

frequency information that is used to indicate an available frequency of the first spectrum.

With reference to the twenty-fifth possible implementation manner of the second aspect, in a twenty-sixth possible implementation manner, the frequency information includes:

a carrier identifier of an available carrier in the first spectrum; or a carrier bitmap, where the carrier bitmap is used to indicate whether carriers in the first spectrum are available.

With reference to any one of the second aspect or the first possible implementation manner to the twenty-sixth possible implementation manner of the second aspect, in a twenty-seventh possible implementation manner, the transceiving module is specifically configured to:

report the obtained feedback information to the first network device on a physical uplink control channel or a physical uplink shared channel.

According to a third aspect, the embodiments of the present invention provide a method for determining availability of a communication spectrum, including:

sending control information to a target terminal, where the control information is used for instructing the target terminal to measure a first spectrum, where the first spectrum is an unlicensed spectrum for a current network device;

receiving feedback information reported by the target terminal, where the feedback information is obtained by the target terminal by measuring the first spectrum; and determining, according to the received feedback information, whether the first spectrum is available.

With reference to the third aspect, in a first possible implementation manner, the control information includes configuration information and activation information, the configuration information includes measurement configuration information required by the target terminal for measuring the first spectrum, and the activation information is used for instructing the target terminal to perform measurement according to the configuration information; and the sending the control information to the target terminal includes: after sending the configuration information to the target terminal, sending the activation information to the target terminal when the target terminal is required to measure the first spectrum; or the control information includes the configuration information; and the sending the control information to the target terminal includes: sending the configuration information to the target terminal when the target terminal is required to measure the first spectrum, so as to instruct the target terminal to perform measurement according to the configuration information.

With reference to the first possible implementation manner of the third aspect, in a second possible implementation manner, the configuration information further includes feedback information reporting condition information, and the feedback information reporting condition information is used for instructing the target terminal to report the feedback information when a condition indicated by the feedback information reporting condition information is met.

With reference to the first possible implementation manner of the third aspect, in a third possible implementation manner, if the control information includes the configuration information and the activation information, after the sending the activation information, the method further includes:

sending deactivation information to the target terminal when the target terminal is required to stop measuring the first spectrum, so as to instruct the target terminal to stop measuring the first spectrum.

With reference to the first possible implementation manner of the third aspect, in a fourth possible implementation manner, if the control information includes the configuration information and the activation information, before the sending the activation information, the method further includes: sending a first receiving threshold to the target terminal, where the first receiving threshold is used for instructing the target terminal to receive the activation information when the following condition is met: a difference between a strength of a received signal transmitted by the current network device and a strength of a signal that is transmitted by another network device and received on the first spectrum is less than the first receiving threshold; or if the control information includes the configuration information, before the sending the configuration information, the method further includes: sending a second receiving threshold to the target terminal, where the second receiving threshold is used for instructing the target terminal to receive the configuration information when the following condition is met: a difference between a strength of a received signal transmitted by the current network device and a strength of a signal that is transmitted by another network device and received on the first spectrum is less than the second receiving threshold.

With reference to the first possible implementation manner of the third aspect, in a fifth possible implementation manner, the method further includes:

identifying the control information by using a first identifier of the target terminal, where the first identifier is used to indicate, to the target terminal, that the control information is sent to the target terminal, and instruct the target terminal to measure the first spectrum, so that the current network device determines whether the first spectrum is available.

With reference to the fifth possible implementation manner of the third aspect, in a sixth possible implementation manner, if the control information includes the configuration information and the activation information, the sending the activation information to the target terminal includes: sending the activation information on a physical downlink control channel; and the identifying the control information by using a first identifier of the target terminal includes:

scrambling cyclic redundancy check CRC information of the activation information by using the first identifier of the target terminal.

With reference to the fifth possible implementation manner of the third aspect, in a seventh possible implementation manner, if the control information includes the configuration information, the sending the configuration information to the target terminal includes: sending the configuration information on a physical downlink control channel; and the identifying the control information by using a first identifier of the target terminal includes:

scrambling CRC information of the configuration information by using the first identifier of the target terminal.

With reference to the first possible implementation manner of the third aspect, in an eighth possible implementation manner, the configuration information includes:

first spectrum information that is used to indicate the first spectrum, so as to indicate the first spectrum to be measured by the target terminal.

With reference to the first possible implementation manner of the third aspect, in a ninth possible implementation manner, the configuration information includes:

feedback resource indication information that is used to indicate a spectrum resource used by the target terminal for reporting the feedback information.

With reference to the first possible implementation manner of the third aspect, in a tenth possible implementation manner, the configuration information includes a network device identifier of another network device that uses the first spectrum; and the control information is specifically used for instructing the target terminal to measure a signal transmitted on the first spectrum by the another network device identified by the network device identifier.

With reference to the first possible implementation manner of the third aspect, in an eleventh possible implementation manner, the feedback information includes:

a measurement result obtained by the target terminal by measuring the first spectrum.

With reference to the first possible implementation manner of the third aspect, in a twelfth possible implementation manner, the feedback information includes:

first indication information that is used to indicate whether the first spectrum is available, where the first indication information is determined by the target terminal according to a measurement result obtained by measuring the first spectrum.

With reference to the twelfth possible implementation manner of the third aspect, in a thirteenth possible implementation manner, the configuration information further includes a first measurement threshold; and the first indication information is determined by the target terminal according to the first measurement threshold and the measurement result that is obtained by the target terminal by measuring the first spectrum.

With reference to the first possible implementation manner of the third aspect, in a fourteenth possible implementation manner, the control information is specifically used for instructing the target terminal to measure the first spectrum and a second spectrum that is being used by the current network device; and the configuration information further includes measurement configuration information required by the target terminal for measuring the second spectrum, where the second spectrum is a licensed spectrum for the current network device.

With reference to the fourteenth possible implementation manner of the third aspect, in a fifteenth possible implementation manner, the configuration information includes:

second spectrum information that is used to indicate the second spectrum, so as to indicate the second spectrum to be measured by the target terminal.

With reference to the fourteenth possible implementation manner of the third aspect, in a sixteenth possible implementation manner, the feedback information includes:

a first measurement result and a second measurement result, where the first measurement result is a measurement result obtained by the target terminal by measuring the first spectrum, and the second measurement result is a measurement result obtained by the target terminal by measuring the second spectrum.

With reference to the sixteenth possible implementation manner of the third aspect, in a seventeenth possible implementation manner, the feedback information further includes second indication information that is used to indicate that the first measurement result is for the first spectrum; and the determining, according to the received feedback information, whether the first spectrum is available includes:

determining the first measurement result and/or the second measurement result from the feedback information according to the second indication information; and determining, according to the first measurement result and the second measurement result, whether the first spectrum is available.

With reference to the sixteenth possible implementation manner of the third aspect, in an eighteenth possible implementation manner, the feedback information further includes third indication information that is used to indicate that the second measurement result is for the second spectrum; and the determining, according to the received feedback information, whether the first spectrum is available includes:

determining the second measurement result and/or the first measurement result from the feedback information according to the third indication information; and determining, according to the first measurement result and the second measurement result, whether the first spectrum is available.

With reference to the fourteenth possible implementation manner of the third aspect, in a nineteenth possible implementation manner, the feedback information includes:

a result of comparing a first measurement result and a second measurement result, where the first measurement result is a measurement result obtained by the target terminal by measuring the first spectrum, and the second measurement result is a measurement result obtained by the target terminal by measuring the second spectrum.

With reference to the nineteenth possible implementation manner of the third aspect, in a twentieth possible implementation manner, the feedback information further includes:

fourth indication information that is used to indicate that the feedback information includes the comparison result; and the determining, according to the received feedback information, whether the first spectrum is available includes:

determining, according to the fourth indication information, that the feedback information includes the comparison result; and determining, according to the comparison result, whether the first spectrum is available.

With reference to the fourteenth possible implementation manner of the third aspect, in a twenty-first possible implementation manner, the feedback information includes:

fifth indication information that is used to indicate whether the first spectrum is available, where the fifth indication information is determined by the target terminal according to a first measurement result and a second measurement result, the first measurement result is a measurement result obtained by the target terminal by measuring the first spectrum, and the second measurement result is a measurement result obtained by the target terminal by measuring the second spectrum.

With reference to the twenty-first possible implementation manner of the third aspect, in a twenty-second possible implementation manner, the configuration information further includes a second measurement threshold; and the fifth indication information is determined by the target terminal according to the second measurement threshold, the first measurement result, and the second measurement result.

With reference to the eleventh possible implementation manner of the third aspect, the twelfth possible implementation manner of the third aspect, the thirteenth possible implementation manner of the third aspect, the sixteenth possible implementation manner of the third aspect, the seventeenth possible implementation manner of the third aspect, the eighteenth possible implementation manner of the third aspect, the nineteenth possible implementation manner of the third aspect, the twentieth possible implementation manner of the third aspect, the twenty-first possible implementation manner of the third aspect, or the twenty-second possible implementation manner of the third aspect, in a twenty-third possible implementation manner, the measurement result includes one of the following information:

received signal strength information;

received signal energy information; or received signal quality information.

With reference to any one of the third aspect or the first possible implementation manner of the third aspect to the twenty-third possible implementation manner of the third aspect, in a twenty-fourth possible implementation manner of the third aspect, the feedback information includes:

time information that is used to indicate available time of the first spectrum.

With reference to the twenty-fourth possible implementation manner of the third aspect, in a twenty-fifth possible implementation manner, the time information includes:

a start moment T1 when the first spectrum becomes available, available duration D1 that starts from the start moment T1 and during which the first spectrum is available, and unavailable duration D2 that starts at the end of the available duration D1 and during which the first spectrum is unavailable; and the determining, according to the received feedback information, whether the first spectrum is available includes:

determining that the first spectrum is available since the start moment T1 and during the duration D1 at a period of D1+D2, and the first spectrum is unavailable during the duration D2 after the duration D1.

With reference to any one of the third aspect or the first possible implementation manner of the third aspect to the twenty-fifth possible implementation manner of the third aspect, in a twenty-sixth possible implementation manner, the feedback information includes:

frequency information that is used to indicate an available frequency of the first spectrum.

With reference to the twenty-sixth possible implementation manner of the third aspect, in a twenty-seventh possible implementation manner, the frequency information includes:

a carrier identifier of an available carrier in the first spectrum; or a carrier bitmap, where the carrier bitmap is used to indicate whether carriers in the first spectrum are available.

With reference to any one of the third aspect or the first possible implementation manner of the third aspect to the twenty-seventh possible implementation manner of the third aspect, in a twenty-eighth possible implementation manner, the receiving the feedback information reported by the target terminal includes:

receiving the feedback information from a physical uplink control channel or a physical uplink shared channel.

According to a fourth aspect, the embodiments of the present invention provide a method for determining availability of a communication spectrum, including:

receiving control information sent by a network device, where the control information is used for instructing a current terminal to measure a first spectrum; and measuring the first spectrum according to the control information, so as to obtain feedback information; and reporting the obtained feedback information to the network device, where the feedback information is used for instructing the network device to determine, according to the feedback information, whether the first spectrum is available, where the first spectrum is an unlicensed spectrum for the network device.

With reference to the fourth aspect, in a first possible implementation manner, the control information includes configuration information and activation information, the configuration information includes measurement configuration information required by the current terminal for measuring the first spectrum, and the activation information is used for instructing the current terminal to perform measurement according to the configuration information; the receiving the control information sent by the network device, and measuring the first spectrum according to the control information include: after receiving the configuration information sent by the network device, receiving the activation information sent by the network device; and measuring the first spectrum according to the configuration information after receiving the activation information; or the control information includes the configuration information; the receiving the control information sent by the network device, and measuring the first spectrum according to the control information include: receiving the configuration information sent by the network device; and measuring the first spectrum according to the configuration information after receiving the configuration information.

With reference to the first possible implementation manner of the fourth aspect, in a second possible implementation manner, the configuration information further includes feedback information reporting condition information:

the reporting the obtained feedback information to the network device includes: reporting the feedback information when a condition indicated by the feedback information reporting condition information is met.

With reference to the first possible implementation manner of the fourth aspect, in a third possible implementation manner, if the control information includes the configuration information and the activation information, after the receiving the activation information sent by the network device, the method further includes:

receiving deactivation information sent by the network device; and stopping, according to the deactivation information, measuring the first spectrum.

With reference to the first possible implementation manner of the fourth aspect, in a fourth possible implementation manner, if the control information includes the configuration information and the activation information, before the receiving the activation information, the method further includes receiving a first receiving threshold sent by the network device; and the receiving the activation information includes: receiving the activation information when a difference between a strength of a received signal transmitted by the network device and a strength of a signal that is transmitted by another network device and received on the first spectrum is less than the first receiving threshold; or if the control information includes the configuration information, before the receiving the configuration information, the method further includes receiving a second receiving threshold sent by the network device; and the receiving the configuration information includes: receiving the configuration information when a difference between a strength of a received signal transmitted by the current network device and a strength of a signal that is transmitted by another network device and received on the first spectrum is less than the second receiving threshold.

With reference to the first possible implementation manner of the fourth aspect, in a fifth possible implementation manner, after the receiving the control information and before the measuring the first spectrum, the method further includes:

determining that the control information is identified by using a first identifier of the current terminal, where the first identifier is used to indicate, to the current terminal, that the control information is sent to the current terminal, and instruct the current terminal to measure the first spectrum, so that the network device determines whether the first spectrum is available.

With reference to the fifth possible implementation manner of the fourth aspect, in a sixth possible implementation manner, if the control information includes the configuration information and the activation information, the receiving the activation information includes receiving the activation information on a physical downlink control channel; and the determining that the control information is identified by using a first identifier of the current terminal includes:

descrambling cyclic redundancy check CRC of the activation information by using the first identifier of the current terminal, and if descrambling is successful, determining that the activation information is identified by using the first identifier of the current terminal.

With reference to the fifth possible implementation manner of the fourth aspect, in a seventh possible implementation manner, if the control information includes the configuration information, the receiving the configuration information includes receiving the configuration information on a physical downlink control channel; and the determining that the control information is identified by using a first identifier of the current terminal includes:

descrambling CRC of the configuration information by using the first identifier of the current terminal, and if descrambling is successful, determining that the configuration information is identified by using the first identifier of the current terminal.

With reference to the first possible implementation manner of the fourth aspect, in an eighth possible implementation manner, the configuration information includes first spectrum information that is used to indicate the first spectrum; and the measuring the first spectrum according to the configuration information, so as to obtain the feedback information includes: measuring the first spectrum indicated by the first spectrum information, so as to obtain the feedback information.

With reference to the first possible implementation manner of the fourth aspect, in a ninth possible implementation manner, the configuration information includes:

feedback resource indication information that is used to indicate a spectrum resource used by the current terminal for reporting the feedback information; and the reporting the obtained feedback information to the network device includes: reporting the feedback information on the spectrum resource indicated by the feedback resource indication information.

With reference to the first possible implementation manner of the fourth aspect, in a tenth possible implementation manner, the configuration information includes a network device identifier of another network device that uses the first spectrum; and the measuring the first spectrum according to the control information, so as to obtain the feedback information includes: measuring a signal transmitted on the first spectrum by the another network device identified by the network device identifier, so as to obtain the feedback information.

With reference to the first possible implementation manner of the fourth aspect, in an eleventh possible implementation manner, the feedback information includes:

a measurement result obtained by measuring the first spectrum.

With reference to the first possible implementation manner of the fourth aspect, in a twelfth possible implementation manner, the feedback information includes first indication information that is used to indicate whether the first spectrum is available; and the measuring the first spectrum according to the control information, so as to obtain the feedback information includes:

measuring the first spectrum according to the configuration information; and determining the first indication information according to a measurement result obtained in the measurement.

With reference to the twelfth possible implementation manner of the fourth aspect, in a thirteenth possible implementation manner, the control information further includes a first measurement threshold; and the measuring the first spectrum according to the control information, so as to obtain the feedback information includes:

measuring the first spectrum according to the configuration information; and determining the first indication information according to the first measurement threshold and the measurement result that is obtained in the measurement.

With reference to the first possible implementation manner of the fourth aspect, in a fourteenth possible implementation manner, the control information is specifically used for instructing the current terminal to measure the first spectrum and a second spectrum that is being used by the network device;

the configuration information further includes measurement configuration information required by the current terminal for measuring the second spectrum; and the measuring the first spectrum according to the control information, so as to obtain the feedback information includes:

measuring the first spectrum and the second spectrum according to the configuration information, so as to obtain the feedback information, where the second spectrum is a licensed spectrum for the network device.

With reference to the fourteenth possible implementation manner of the fourth aspect, in a fifteenth possible implementation manner, the configuration information includes second spectrum information that is used to indicate the second spectrum; and the measuring the first spectrum and the second spectrum according to the configuration information, so as to obtain the feedback information includes: measuring the first spectrum and the second spectrum that is indicated by the second spectrum information, so as to obtain the feedback information.

With reference to the fourteenth possible implementation manner of the fourth aspect, in a sixteenth possible implementation manner, the feedback information includes:

a first measurement result and a second measurement result, where the first measurement result is a measurement result obtained by the current terminal by measuring the first spectrum, and the second measurement result is a measurement result obtained by the current terminal by measuring the second spectrum.

With reference to the sixteenth possible implementation manner of the fourth aspect, in a seventeenth possible implementation manner, the feedback information further includes:

second indication information that is used to indicate that the first measurement result is for the first spectrum; and/or third indication information that is used to indicate that the second measurement result is for the second spectrum.

With reference to the fourteenth possible implementation manner of the fourth aspect, in an eighteenth possible implementation manner, the feedback information includes:

a result of comparing a first measurement result and a second measurement result, where the first measurement result is a measurement result obtained by the current terminal by measuring the first spectrum, and the second measurement result is a measurement result obtained by the current terminal by measuring the second spectrum.

With reference to the eighteenth possible implementation manner of the fourth aspect, in a nineteenth possible implementation manner, the feedback information further includes:

fourth indication information that is used to indicate that the feedback information includes the comparison result.

With reference to the fourteenth possible implementation manner of the fourth aspect, in a twentieth possible implementation manner, the feedback information includes:

fifth indication information that is used to indicate whether the first spectrum is available, where the fifth indication information is determined by the current terminal according to a first measurement result and a second measurement result, the first measurement result is a measurement result obtained by the current terminal by measuring the first spectrum, and the second measurement result is a measurement result obtained by the current terminal by measuring the second spectrum.

With reference to the twentieth possible implementation manner of the fourth aspect, in a twenty-first possible implementation manner, the configuration information further includes a second measurement threshold; and the fifth indication information is determined by the current terminal according to the second measurement threshold, the first measurement result, and the second measurement result.

With reference to any one of the eleventh possible implementation manner to the thirteenth possible implementation manner or any one of the sixteenth possible implementation manner to the twenty-first possible implementation manner of the fourth aspect, in a twenty-second possible implementation manner, the measurement result includes one of the following information:

received signal strength information;
received signal energy information; or
received signal quality information.

With reference to any one of the fourth aspect or the first possible implementation manner to the twenty-second possible implementation manner of the fourth aspect, in a twenty-third possible implementation manner, the feedback information includes:

time information that is used to indicate available time of the first spectrum.

With reference to the twenty-third possible implementation manner of the fourth aspect, in a twenty-fourth possible implementation manner, the time information includes: a start moment T1 when the first spectrum becomes available, available duration D1 that starts from the start moment T1 and during which the first spectrum is available, and unavailable duration D2 that starts at the end of the available duration D1 and during which the first spectrum is unavailable; and the network device is instructed to determine:

the first spectrum is available since the start moment T1 and during the duration D1 at a period of D1+D2, and the first spectrum is unavailable during the duration D2 after the duration D1.

With reference to any one of the fourth aspect or the first possible implementation manner to the twenty-fourth possible implementation manner of the fourth aspect, in a twenty-fifth possible implementation manner, the feedback information includes:

frequency information that is used to indicate an available frequency of the first spectrum.

With reference to the twenty-fifth possible implementation manner of the fourth aspect, in a twenty-sixth possible implementation manner, the frequency information includes:

a carrier identifier of an available carrier in the first spectrum; or a carrier bitmap, where the carrier bitmap is used to indicate whether carriers in the first spectrum are available.

With reference to any one of the fourth aspect or the first possible implementation manner to the twenty-sixth possible implementation manner of the fourth aspect, in a twenty-seventh possible implementation manner, the reporting the obtained feedback information to the network device includes:

reporting the obtained feedback information to the network device on a physical uplink control channel or a physical uplink shared channel.

In the embodiments of the present invention, a network device instructs a terminal to measure an unlicensed first spectrum. The network device receives feedback information reported by the terminal, and the feedback information is obtained by the terminal by measuring the first spectrum. The network device determines, according to the received feedback information, whether the first spectrum is available. By measuring the unlicensed first spectrum, the terminal may more accurately determine whether another network device is using the unlicensed first spectrum, so as to effectively avoid interference from the another network device.

DESCRIPTION OF EMBODIMENTS

Embodiments of the present invention provide a network device, a terminal, and a method for determining availability of a communication spectrum, so as to resolve the following problem: When a network device fails to effectively perceive another network device, but uses a communication spectrum of the another network device to communicate with a terminal, the communication between the network device and the terminal may be interfered with by the another network device.

In the embodiments of the present invention, a network device instructs a terminal to measure an unlicensed first spectrum. The network device receives feedback information reported by the terminal, and the feedback information is obtained by the terminal by measuring the first spectrum. The network device determines, according to the received feedback information, whether the first spectrum is available. By measuring the unlicensed first spectrum, the terminal may more accurately determine whether another network device is using the unlicensed first spectrum, so as to effectively avoid interference from the another network device.

The following describes the embodiments of the present invention in detail with reference to accompanying drawings. First, a wireless communications system provided in the embodiments of the present invention is described from the perspective of mutual cooperation between a network device and a terminal. Then, a network device and a terminal that are provided in the embodiments of the present invention are described separately. Finally, two methods for determining availability of a spectrum that are provided in the embodiments of the present invention are described.

Figure 1:
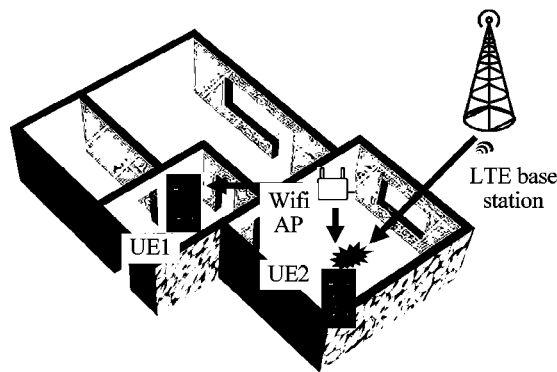
FIG. 1 is a schematic diagram of an HTP problem.
Figure 2:
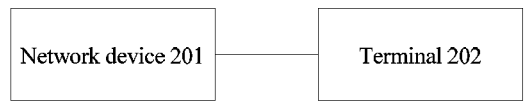
FIG. 2 is a schematic structural diagram of a wireless communications system according to an embodiment of the present invention.

FIG. 2 is a wireless communications system according to an embodiment of the present invention. As shown in FIG. 2, the system includes a network device 201 and a terminal 202.

The network device 201 is configured to: send control information to the terminal 202 to instruct the terminal 202 to measure a first spectrum; and receive feedback information that is reported by the terminal 202 and obtained by measuring the first spectrum; and determine, according to the received feedback information, whether the first spectrum is available.

The terminal 202 is configured to: receive the control information sent by the network device 201; measure the first spectrum according to the control information, so as to obtain the feedback information; and report the obtained feedback information to the network device 201.

The first spectrum is an unlicensed spectrum for the network device 201.

The network device 201 may include but is not limited to any device of the following devices: a base station (Base Station, BS), a nodeB (NodeB), an evolved nodeB (evolved NodeB, eNB), a base station controller (Base Station Controller, BSC), a radio network controller (Radio Network Controller, RNC), a WiFi AP, or a WiFi access controller (Access Controller, AC).

The network device 201 may first scan a signal on the first spectrum when needing to use the first spectrum. If a signal strength or energy of the scanned signal is less than a preset threshold, the network device 201 sends the control information to the terminal 202 within a coverage area of the network device 201, to instruct the terminal 202 to measure the first spectrum.

The network device 201 herein may determine the terminal 202 from terminals within the coverage area of the network device 201 according to received strengths or energies of signals that are of the network device 201 and another network device and received by the terminals. The strengths or the energies are fed back by the terminals. For example, a terminal 202 is selected from the terminals. A difference between signal strengths of signals received by the terminal 202 from the network device 201 and another network device is within a specified range. According to the difference between the received strengths of the signals that are received by the terminal 202 from the network device 201 and the another network device, it is determined that the terminal 202 is located on an edge of the coverage area of the network device 201 but can correctly receive the control information sent by the network device 201. The strengths are fed back by the terminal 202.

Alternatively, the network device 201 broadcasts the control information, or sends the control information to multiple terminals 202 within the coverage area of the network device 201, to instruct a terminal that receives the control information to measure the first spectrum.

Alternatively, before the network device 201 uses the first spectrum to communicate with a terminal 202, the network device 201 sends the control information to the terminal 202 that is to communicate with the network device 201, to instruct the terminal 202 to measure the first spectrum.

Optionally, the network device 201 may identify the control information by using a first identifier of the terminal 202. The first identifier is used to indicate the following to the terminal 202:

the control information is sent to the terminal 202; and the first identifier is used for instructing the terminal 202 to measure the first spectrum, so that the network device 201 determines whether the first spectrum is available.

Correspondingly, if the first identifier that identifies the control information is a first identifier of the terminal 202, the terminal 202 determines that the control information is sent to the terminal 202 to instruct the terminal 202 to measure the first spectrum.

Optionally, there are two forms of control information:

control information form 1: The control information includes configuration information and activation information; and control information form 2: The control information includes configuration information.

The configuration information includes measurement configuration information required by the terminal 202 for measuring the first spectrum, for example:

feedback information reporting condition information: the feedback information reporting condition information is used for instructing the terminal 202 to report the feedback information when a condition indicated by the feedback information reporting condition information is met;

first spectrum information that is used to indicate the first spectrum: the first spectrum information indicates the first spectrum to be measured by the terminal 202;

feedback resource indication information: the feedback resource indication information is used to indicate a spectrum resource used by the terminal 202 for reporting the feedback information; the frequency resource may be located on a second spectrum that is being used by the network device 201, or may be located on the first spectrum; if the spectrum resource is located on the first spectrum, it is required to be ensured that the spectrum resource is reserved, so that uplink interference from another network device to the network device 201 is avoided;

a network device identifier of another network device that uses the first spectrum: the network device identifier is used for instructing the terminal 202 to measure a signal transmitted on the first spectrum by the another network device identified by the network device identifier; and measurement duration information: the measurement duration information is used to indicate duration of measuring the first spectrum by the terminal 202.

For the control information form 1, after sending the activation information, the network device 201 sends deactivation information to the terminal 202 when the terminal 202 is required to stop measuring the first spectrum, so as to instruct the terminal 202 to stop measuring the first spectrum.

For the control information form 1, the network device 201 first sends the configuration information to the terminal 202, for example, may send the configuration information to all terminals within the coverage area of the network device 201 by using a system message, or may send the configuration information to the terminal 202 by using dedicated signaling, such as radio resource control (Radio Resource Control, RRC) signaling. Then, when the network device 201 requires the terminal 202 to measure the first spectrum, for example, needs to use the first spectrum to perform communication, or needs to use the first spectrum to communicate with the terminal 202, the network device 201 sends the activation information to the terminal 202 to activate the terminal 202 to measure the first spectrum. The activation information may be sent by using dedicated signaling, such as RRC signaling, or using a physical downlink control channel (Physical Downlink Control Channel, PDCCH).

Correspondingly, the terminal 202 may store the configuration information after receiving the configuration information. Then, the terminal 202 measures the first spectrum according to the pre-stored configuration information after receiving the activation information.

For the control information form 1, if the network device 201 sends the activation information on a PDCCH, optionally, the network device 201 may scramble cyclic redundancy check (Cyclic Redundancy Check, CRC) information of the activation information by using the first identifier of the terminal 202, so as to identify the control information by using the first identifier of the terminal 202.

Correspondingly the terminal 202 may receive the activation information on the PDCCH, descramble the CRC of the activation information by using the first identifier of the terminal 202, and if descrambling is successful, determine that the activation information is identified by using the first identifier of the terminal 202.

Optionally, the first identifier may be named: hidden node-detection-radio network temporary identity (HTP-detection-Radio Network Temporary Identity, HTP-detection-RNTI).

For the control information form 2, the network device 201 directly sends the configuration information to the terminal 202, instructs the terminal 202 to perform measurement, and does not need to send the activation information to activate measurement. Correspondingly, after receiving the configuration information, the terminal 202 measures the first spectrum according to the configuration information, and does not need to wait for the activation information. Optionally, the configuration information may be sent by using dedicated signaling, such as RRC signaling, or using a PDCCH. If the configuration information is sent by using a PDCCH, alternatively, the configuration information may be identified by scrambling CRC information of the configuration information by using the first identifier of the terminal 202. Correspondingly the terminal 202 receives the configuration information on the PDCCH, descrambles the CRC of the configuration information by using the first identifier of the terminal 202, and if descrambling is successful, determines that the configuration information is identified by using the first identifier of the terminal 202.

Optionally, to prevent the terminal 202 from frequently receiving control information, and prevent high power consumption and a large processing load of the terminal, the terminal may receive control information only when a preset condition is met.

For example, for the control information form 1, before sending the activation information, the network device 201 may send a first receiving threshold to the terminal 202 by means of broadcast or using dedicated signaling, and the terminal 202 receives the activation information when the following condition is met:

a difference between a strength of a received signal transmitted by the network device 201 and a strength of a signal that is transmitted by another network device and received on the first spectrum is less than the first receiving threshold.

For the control information form 2, before sending the configuration information, the network device 201 may send a second receiving threshold to the terminal 202 by means of broadcast or using dedicated signaling, and the terminal 202 receives the configuration information when the following condition is met:

a difference between a strength of a received signal transmitted by the network device 201 and a strength of a signal that is transmitted by another network device and received on the first spectrum is less than the second receiving threshold.

The terminal 202 may perform measurement in the following two manners:

measurement manner 1: measuring the first spectrum; and measurement manner 2: measuring the first spectrum and a second spectrum, where the second spectrum is a spectrum that is being used by the network device 201.

For the measurement manner 2, the configuration information sent by the network device 201 may further include: measurement configuration information required by the terminal 202 for measuring the second spectrum, for example, second spectrum information that is used to indicate the second spectrum, so as to indicate the second spectrum to be measured by the terminal 202; and measurement duration information that is used to indicate duration of measuring the second spectrum by the terminal 202.

The terminal 202 may measure a strength of a received signal, an energy of a received signal, or quality of a received signal. Correspondingly, if a strength of a received signal is measured, a measurement result includes strength information of the received signal; if an energy of a received signal is measured, a measurement result includes energy information of the received signal; if quality of a received signal is measured, a measurement result includes quality information of the received signal.

For the foregoing two measurement cases, there are multiple feedback mechanisms when the terminal 202 performs feedback:

feedback mechanism 1: feeding back a measurement result;

feedback mechanism 2: feeding back a result of comparing measurement results, where the mechanism is applicable to only the measurement manner 2, and the comparison result is a result of comparing a measurement result obtained by measuring the first spectrum and a measurement result obtained by measuring the second spectrum;

feedback mechanism 3: feeding back indication information that is used to indicate whether the first spectrum is available, where the indication information is determined by the terminal 202 according to a measurement result; and feedback mechanism 4: feeding back time information that is used to indicate available time of the first spectrum, and/or frequency information that is used to indicate an available frequency of the first spectrum.

Six possible combinations of the foregoing is shown as follows:

TABLE 1

| Feedback mechanism | Measurement manner | |
|---|---|---|
| | Measurement manner 1 | Measurement manner 2 |
| Feedback mechanism 1 | Feed back a measurement result of measuring the first spectrum | Feed back a measurement result of measuring the first spectrum and a measurement result of measuring the second spectrum |
| Feedback mechanism 2 | — | Feed back a result of comparing a measurement result of measuring the first spectrum and a measurement result of measuring the second spectrum |
| Feedback mechanism 3 | Feed back indication information that is used to indicate whether the first spectrum is available, and the indication information is determined by the terminal 202 according to a measurement result obtained by measuring the first spectrum | Feed back indication information that is used to indicate whether the first spectrum is available, and the indication information is determined by the terminal 202 according to a measurement result obtained by measuring the first spectrum and a measurement result obtained by measuring the second spectrum |
| Feedback mechanism 4 | Feed back time information that is used to indicate available time of the first spectrum, and/or frequency information that is used to indicate an available frequency of the first spectrum | |

The network device 201 may add, to the configuration information, indication information that is used to indicate a feedback mechanism and/or a measurement manner; or the network device 201 and the terminal 202 use, according to a protocol, a feedback mechanism or a measurement manner or both that are specified in the protocol; or the network device 201 may broadcast, in a system message, indication information that is used to indicate a feedback mechanism and/or a measurement manner.

Regardless of a feedback mechanism that is used, the terminal 202 may send feedback information to the network device 201 on a physical uplink control channel (Physical Uplink Control CHannel, PUCCH) or a physical uplink shared channel (Physical Uplink Shared CHannel, PUSCH).

For the feedback mechanism 3, the network device 201 may further add a measurement threshold to the sent configuration information, and the terminal 202 determines, according to the measurement threshold and a measurement result, indication information that is used to indicate whether the first spectrum is available.

For example, for the measurement manner 1, the network device 201 adds a first measurement threshold to the configuration information, and when a measurement result obtained by measuring the first spectrum is greater than the first measurement threshold, the terminal 202 determines that the indication information that is used to indicate whether the first spectrum is available is: the first spectrum is unavailable.

Measurement of a received signal strength indicator (Received Signal Strength Indication, RSSI) is used as an example. If an RSSI obtained by measuring the first spectrum is greater than the first measurement threshold, the terminal 202 feeds back, to the network device 201, information that the first spectrum is unavailable.

For another example, for the measurement manner 2, the network device 201 adds a second measurement threshold to the configuration information, and the terminal 202 compares the second measurement threshold with a difference between a measurement result obtained by measuring the first spectrum and a measurement result obtained by measuring the second spectrum, to determine indication information that is used to indicate whether the first spectrum is available.

Measurement of a channel quality indicator (Channel Quality Indicator, CQI) is used as an example. If a difference between a value of a CQI obtained by the terminal 202 by measuring the first spectrum and a value of a CQI obtained by the terminal 202 by measuring the second spectrum is greater than the second measurement threshold, the terminal 202 determines that the indication information that is used to indicate whether the first spectrum is available is: the first spectrum is available.

For another example, for the measurement manner 2, the network device 201 adds a third measurement threshold and a fourth measurement threshold to the configuration information, and the terminal 202 compares the third measurement threshold with a measurement result obtained by measuring the first spectrum, and compares the fourth measurement threshold with a difference between the measurement result obtained by measuring the first spectrum and a measurement result obtained by measuring the second spectrum, to determine indication information that is used to indicate whether the first spectrum is available.

Still, measurement of a CQI is used as an example. If a value of a CQI obtained by the terminal 202 by measuring the first spectrum is greater than the third measurement threshold, and a value of a CQI obtained by the terminal 202 by measuring the second spectrum is less than the fourth measurement threshold, the terminal 202 determines that the indication information that is used to indicate whether the first spectrum is available is: the first spectrum is available.

Figure 3A:
FIG. 3A to FIG. 3E are schematic diagrams of a manner of sending feedback information by a terminal.
Figure 3B:

For the measurement manner 2, when the feedback mechanism 1 is used, optionally, in addition to a measurement result (referred to as "a first measurement result") obtained by measuring the first spectrum and fed back by the terminal 202, and a measurement result (referred to as "a second measurement result") obtained by measuring the second spectrum, the feedback information may further include indication information that is used to indicate that the first measurement result is for the first spectrum. The network device 201 may determine, from the feedback information and according to the indication information, which measurement result is the first measurement result, and optionally, may further determine that the other measurement result is the second measurement result. As shown in FIG. 3B, MPRT1 is the first measurement result, MPRT2 is the second measurement result, and IND1 is used for indicating that MPRT1 is the first measurement result for the first spectrum. The network device 201 determines, according to IND1, that a measurement result followed by IND1 is the first measurement result and a following measurement result is the second measurement result.

Figure 3C:
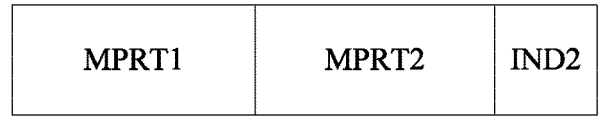

Similarly, the feedback information may further include indication information that is used to indicate that the second measurement result is for the second spectrum. The network device 201 may determine, from the feedback information and according to the indication information, which measurement result is the second measurement result, and optionally, may further determine that the other measurement result is the first measurement result. As shown in FIG. 3C, MPRT1 is the first measurement result, MPRT2 is the second measurement result, and IND2 is used for indicating that MPRT2 is the second measurement result for the second spectrum. The network device 201 determines, according to IND2, that a measurement result followed by IND2 is the second measurement result and a measurement result followed by the second measurement result is the first measurement result.

Figure 3D:
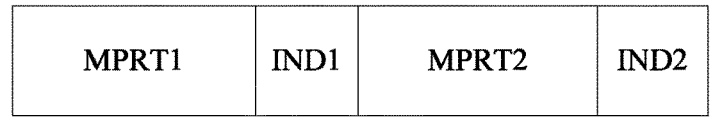

Alternatively, the feedback information may include both indication information that is used to indicate that the second measurement result is for the second spectrum and indication information that is used to indicate that the first measurement result is for the first spectrum. The network device 201 may determine, according to the two pieces of indication information, which is the first measurement result, and which is the second measurement result. As shown in FIG. 3D, MPRT1 is the first measurement result, MPRT2 is the second measurement result, IND1 is used for indicating that MPRT1 is the first measurement result for the first spectrum, and IND2 is used for indicating that MPRT2 is the second measurement result for the second spectrum. The network device 201 determines, according to IND1, that a measurement result followed by IND1 is the first measurement result and determines, according to IND2, that a measurement result followed by IND2 is the second measurement result.

Alternatively, there may be no indication information, and the network device 201 and the terminal 202 predetermine, or both agree on, according to a protocol, that a former measurement result in measurement results is the first measurement result and a latter measurement result is the second measurement result. As shown in FIG. 3A, MPRT1 is the first measurement result and MPRT2 is the second measurement result.

Figure 3E:
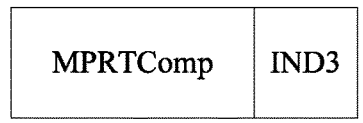

For the measurement manner 2, when the feedback mechanism 2 is used, in addition to a result of comparing a first measurement result and a second measurement result, optionally, the feedback information may further include indication information that is used to indicate that the feedback information includes the comparison result. The network device 201 determines, according to the indication information, that the feedback information includes the comparison result. As shown in FIG. 3E, MPRTComp is the result of comparing the first measurement result and the second measurement result, and IND3 is the indication information that is used to indicate that MPRTComp is the comparison result.

The feedback mechanism 4 in Table 1 is applicable to the measurement manner 1 and the measurement manner 2, and may be used together with the foregoing multiple feedback mechanisms, for example, may be used together with the feedback mechanism 1 of the measurement manner 1. In a possible implementation manner, when sending feedback information to the network device 201, the terminal 202 not only adds a measurement result obtained by measuring the first spectrum, but also adds time information that is determined by the terminal 202 and used to indicate available time of the first spectrum. The network device 201 may determine, according to the measurement result reported by the terminal 202, whether the first spectrum is available, and if the first spectrum is available, determine, according to the time information reported by the terminal 202, when the first spectrum is available.

For another example, the feedback mechanism 4 may be used together with the feedback mechanism 2 of the measurement manner 4. In a possible implementation manner, when sending feedback information to the network device 201, the terminal 202 not only adds indication information that is used to indicate whether the first spectrum is available, but also adds frequency information that is determined by the terminal 202 and used to indicate an available frequency of the first spectrum. The network device 201 may determine, according to the indication information that is reported by the terminal 202 and used to indicate whether the first spectrum is available, whether the first spectrum is available, and if the first spectrum is available, determine, according to the frequency information reported by the terminal 202, which carrier in the first spectrum is available.

The following describes a principle of determining, by the terminal 202, time information that is used to indicate available time of the first spectrum and a principle of determining, by the terminal 202, frequency information that is used to indicate an available frequency of the first spectrum.

In a wireless communications system, because a multipath effect causes selective fading of signal frequency, and rapid movement of a terminal causes Doppler frequency shift, time-selective fading is caused. The terminal 202 may collect statistics on signals received in a specific period of time, and if signal shading is regular, may notify the network device 201 of information related to the regularity. For example, the time information that is used to indicate available time of the first spectrum is sent to the network device 201, so that the network device 201 determines when the first spectrum is available; and the frequency information that is used to indicate an available frequency of the first spectrum is sent to the network device 201, so that the network device 201 determines which frequency in the first spectrum is available.

In another instance, there are two situations for surrounding network devices: initiating communication and not initiating communication. Consequently, interference detected by the terminal 202 drastically changes. The terminal 202 may collect statistics on signals received in a specific period of time, and if signals are regular, may notify the network device 201 of information related to the regularity. For example, the time information that is used to indicate available time of the first spectrum is sent to the network device 201, so that the network device 201 determines when the first spectrum is available; and the frequency information that is used to indicate an available frequency of the first spectrum is sent to the network device 201, so that the network device 201 determines which frequency in the first spectrum is available. If signals are not regular, only an indication about whether the first spectrum is available or unavailable is fed back.

Figure 4:
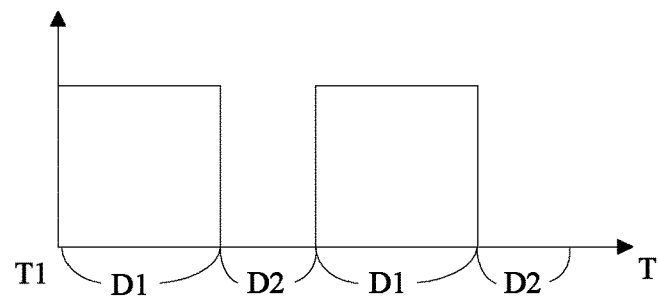
FIG. 4 is a schematic diagram of time information in feedback information sent by a terminal.

Specifically, as shown in FIG. 4, the time information may include: a start moment T1 when the first spectrum becomes available, available duration D1 that starts from the start moment T1 and during which the first spectrum is available, and unavailable duration D2 that starts at the end of the available duration D1 and during which the first spectrum is unavailable; and after receiving the time information, the network device 201 may determine: the first spectrum is available since the start moment T1 and during the duration D1 at a period of (D1+D2), and the first spectrum is unavailable during the duration D2 after the duration D1.

Specifically, the frequency information may include a carrier identifier of an available carrier in the first spectrum, for example, $C_i$, where $i=1 \ldots N$, and N is a positive integer and a quantity of carriers in the first spectrum.

Alternatively, the frequency information may include a carrier bitmap, and the carrier bitmap is used to indicate whether carriers in the first spectrum are available. For example, the first spectrum has seven carriers, and in a carrier bitmap, 1101001 may indicate that the first, second, fourth, and seventh carriers are available, and other carriers are unavailable.

The foregoing describes a wireless communications system according to an embodiment of the present invention. Based on a same invention concept, the embodiments of the present invention further provide a network device and a terminal, and a method for determining availability of a spectrum. Because a problem resolving principle is similar to that of the foregoing wireless communications system, the implementation of the system may also be referred to during implementation. Repeated details are not described again.

Figure 5:
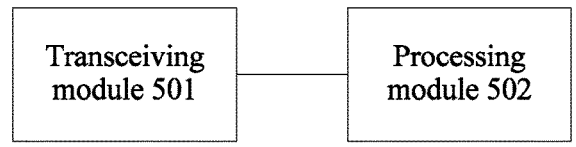
FIG. 5 is a schematic structural diagram of a first network device according to an embodiment of the present invention.

FIG. 5 is a schematic structural diagram of a first network device according to an embodiment of the present invention. As shown in FIG. 5, the first network device includes:

a transceiving module 501, configured to: send control information to a target terminal, where the control information is used for instructing the target terminal to measure a first spectrum, and the first spectrum is an unlicensed spectrum for the first network device; and receive feedback information reported by the target terminal, where the feedback information is obtained by the target terminal by measuring the first spectrum; and a processing module 502, configured to determine, according to the feedback information received by the transceiving module 501, whether the first spectrum is available.

Optionally, the control information includes configuration information and activation information, the configuration information includes measurement configuration information required by the target terminal for measuring the first spectrum, and the activation information is used for instructing the target terminal to perform measurement according to the configuration information; and the transceiving module 501 is specifically configured to: after sending the configuration information to the target terminal, send the activation information to the target terminal when the target terminal is required to measure the first spectrum; or the control information includes the configuration information; and the transceiving module 501 is specifically configured to send the configuration information to the target terminal when the target terminal is required to measure the first spectrum, so as to instruct the target terminal to perform measurement according to the configuration information.

Optionally, the configuration information further includes feedback information reporting condition information: the feedback information reporting condition information is used for instructing the target terminal to report the feedback information when a condition indicated by the feedback information reporting condition information is met.

Optionally, if the control information includes the configuration information and the activation information, the transceiving module 501 is further configured to:

after sending the activation information, send deactivation information to the target terminal when the target terminal is required to stop measuring the first spectrum, so as to instruct the target terminal to stop measuring the first spectrum.

Optionally, if the control information includes the configuration information and the activation information, the transceiving module 501 is further configured to:

send a first receiving threshold to the target terminal before sending the activation information, where the first receiving threshold is used for instructing the target terminal to receive the activation information when the following condition is met:

a difference between a strength of a signal that is transmitted by the first network device and received by the target terminal and a strength of a signal that is transmitted by another network device and received on the first spectrum is less than the first receiving threshold.

Optionally, if the control information includes the configuration information, the transceiving module 501 is further configured to:

send a second receiving threshold to the target terminal before sending the configuration information, where the second receiving threshold is used for instructing the target terminal to receive the configuration information when the following condition is met:

a difference between a strength of a signal that is transmitted by the first network device and received by the target terminal and a strength of a signal that is transmitted by another network device and received on the first spectrum is less than the second receiving threshold.

Optionally, the transceiving module 501 is further configured to identify the control information by using a first identifier of the target terminal, where the first identifier is used to indicate, to the target terminal, that the control information is sent to the target terminal, and instruct the target terminal to measure the first spectrum, so that the first network device determines whether the first spectrum is available.

Optionally, if the control information includes the configuration information and the activation information, the transceiving module 501 is specifically configured to send the activation information on a physical downlink control channel, and scramble cyclic redundancy check CRC information of the activation information by using the first identifier of the target terminal.

Optionally, if the control information includes the configuration information, the transceiving module 501 is specifically configured to send the configuration information on a physical downlink control channel, and scramble CRC information of the configuration information by using the first identifier of the target terminal.

Optionally, the configuration information includes:

first spectrum information that is used to indicate the first spectrum, so as to indicate the first spectrum to be measured by the target terminal.

Optionally, the configuration information includes:

feedback resource indication information that is used to indicate a spectrum resource used by the target terminal for reporting the feedback information.

Optionally, the configuration information includes a network device identifier of another network device that uses the first spectrum; and the control information is specifically used for instructing the target terminal to measure a signal transmitted on the first spectrum by the another network device identified by the network device identifier.

Optionally, the feedback information includes:
a measurement result obtained by the target terminal by measuring the first spectrum.

Optionally, the feedback information includes:
first indication information that is used to indicate whether the first spectrum is available, where
the first indication information is determined by the target terminal according to a measurement result obtained by measuring the first spectrum.

Optionally, the configuration information further includes a first measurement threshold; and
the first indication information is determined by the target terminal according to the first measurement threshold and the measurement result that is obtained by the target terminal by measuring the first spectrum.

Optionally, the control information is specifically used for instructing the target terminal to measure the first spectrum and a second spectrum that is being used by the first network device; and
the configuration information further includes measurement configuration information required by the target terminal for measuring the second spectrum, where
the second spectrum is a licensed spectrum for the first network device.

Optionally, the configuration information includes:
second spectrum information that is used to indicate the second spectrum, so as to indicate the second spectrum to be measured by the target terminal.

Optionally, the feedback information includes: a first measurement result and a second measurement result, where
the first measurement result is a measurement result obtained by the target terminal by measuring the first spectrum, and the second measurement result is a measurement result obtained by the target terminal by measuring the second spectrum.

Optionally, the feedback information further includes second indication information that is used to indicate that the first measurement result is for the first spectrum; and
the processing module 502 is specifically configured to:
determine the first measurement result and/or the second measurement result from the feedback information according to the second indication information; and
determine, according to the first measurement result and the second measurement result, whether the first spectrum is available.

Optionally, the feedback information further includes third indication information that is used to indicate that the second measurement result is for the second spectrum; and
the processing module 502 is specifically configured to:
determine the second measurement result and/or the first measurement result from the feedback information according to the third indication information; and
determine, according to the first measurement result and the second measurement result, whether the first spectrum is available.

Optionally, the feedback information includes:
a result of comparing a first measurement result and a second measurement result, where
the first measurement result is a measurement result obtained by the target terminal by measuring the first spectrum, and the second measurement result is a measurement result obtained by the target terminal by measuring the second spectrum.

Optionally, the feedback information further includes:
fourth indication information that is used to indicate that the feedback information includes the comparison result; and the processing module 502 is specifically configured to:
determine, according to the fourth indication information, that the feedback information includes the comparison result; and
determine, according to the comparison result, whether the first spectrum is available.

Optionally, the feedback information includes:
fifth indication information that is used to indicate whether the first spectrum is available, where
the fifth indication information is determined by the target terminal according to a first measurement result and a second measurement result, the first measurement result is a measurement result obtained by the target terminal by measuring the first spectrum, and the second measurement result is a measurement result obtained by the target terminal by measuring the second spectrum.

Optionally, the configuration information further includes a second measurement threshold; and
the fifth indication information is determined by the target terminal according to the second measurement threshold, the first measurement result, and the second measurement result.

Optionally, the measurement result includes one of the following information:
received signal strength information;
received signal energy information; or
received signal quality information.

Optionally, the feedback information includes:
time information that is used to indicate available time of the first spectrum.

Optionally, the time information includes:
a start moment T1 when the first spectrum becomes available, available duration D1 that starts from the start moment T1 and during which the first spectrum is available, and unavailable duration D2 that starts at the end of the available duration D1 and during which the first spectrum is unavailable; and
the processing module 502 is specifically configured to:
determine that the first spectrum is available since the start moment T1 and during the duration D1 at a period of D1+D2, and the first spectrum is unavailable during the duration D2 after the duration D1.

Optionally, the feedback information includes:
frequency information that is used to indicate an available frequency of the first spectrum.

Optionally, the frequency information includes:
a carrier identifier of an available carrier in the first spectrum; or
a carrier bitmap, where the carrier bitmap is used to indicate whether carriers in the first spectrum are available.

Optionally, the transceiving module 501 is specifically configured to: receive the feedback information from a physical uplink control channel or a physical uplink shared channel.

Figure 6:
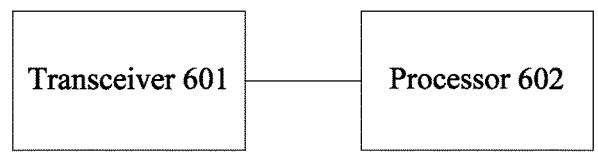
FIG. 6 is a schematic structural diagram of another first network device according to an embodiment of the present invention.

FIG. 6 is a schematic structural diagram of another first network device according to an embodiment of the present invention. As shown in FIG. 6, the first network device includes:
a transceiver 601, configured to: send control information to a target terminal, where the control information is used for instructing the target terminal to measure a first spectrum, and the first spectrum is an unlicensed spectrum for the first network device; and receive feedback information reported by the target terminal, where the feedback information is obtained by the target terminal by measuring the first spectrum; and a processor 602, configured to determine, according to the feedback information received by the transceiver 601, whether the first spectrum is available.

Optionally, the control information includes configuration information and activation information, the configuration information includes measurement configuration information required by the target terminal for measuring the first spectrum, and the activation information is used for instructing the target terminal to perform measurement according to the configuration information; and the transceiver 601 is specifically configured to: after sending the configuration information to the target terminal, send the activation information to the target terminal when the target terminal is required to measure the first spectrum; or the control information includes the configuration information; and the transceiver 601 is specifically configured to send the configuration information to the target terminal when the target terminal is required to measure the first spectrum, so as to instruct the target terminal to perform measurement according to the configuration information.

Optionally, the transceiver 601 is further configured to identify the control information by using a first identifier of the target terminal, where the first identifier is used to indicate, to the target terminal, that the control information is sent to the target terminal, and instruct the target terminal to measure the first spectrum, so that the first network device determines whether the first spectrum is available.

Optionally, if the control information includes the configuration information and the activation information, the transceiver 601 is specifically configured to send the activation information on a physical downlink control channel, and scramble cyclic redundancy check CRC information of the activation information by using the first identifier of the target terminal.

Optionally, if the control information includes the configuration information, the transceiver 601 is specifically configured to send the configuration information on a physical downlink control channel, and scramble CRC information of the configuration information by using the first identifier of the target terminal.

Optionally, the configuration information includes:

first spectrum information that is used to indicate the first spectrum, so as to indicate the first spectrum to be measured by the target terminal.

Figure 7:
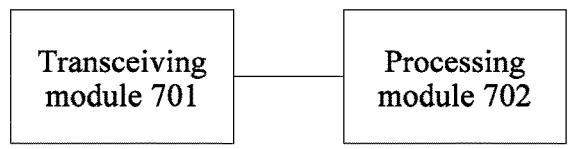
FIG. 7 is a schematic structural diagram of a terminal according to an embodiment of the present invention.

FIG. 7 is a schematic structural diagram of a first type of terminal according to an embodiment of the present invention. As shown in FIG. 7, the terminal includes:

a transceiving module 701, configured to receive control information sent by a first network device, where the control information is used for instructing the terminal to measure a first spectrum; and a processing module 702, configured to measure the first spectrum according to the control information, so as to obtain feedback information.

The transceiving module 701 is further configured to report the obtained feedback information to the first network device, where the feedback information is used for instructing the first network device to determine, according to the feedback information, whether the first spectrum is available.

The first spectrum is an unlicensed spectrum for the first network device.

Optionally, the control information includes configuration information and activation information, the configuration information includes measurement configuration information required by the terminal for measuring the first spectrum, and the activation information is used for instructing the terminal to perform measurement according to the configuration information; the transceiving module 701 is specifically configured to: after receiving the configuration information sent by the first network device, receive the activation information sent by the first network device; and the processing module 702 is specifically configured to measure the first spectrum according to the configuration information after receiving the activation information; or the control information includes the configuration information; the transceiving module 701 is specifically configured to receive the configuration information sent by the first network device; and the processing module 702 is specifically configured to measure the first spectrum according to the configuration information after receiving the configuration information.

Optionally, the configuration information further includes feedback information reporting condition information; and the transceiving module 701 is specifically configured to report the feedback information when a condition indicated by the feedback information reporting condition information is met.

Optionally, if the control information includes the configuration information and the activation information, the transceiving module 701 is further configured to: after receiving the activation information sent by the first network device, receive deactivation information sent by the first network device; and the processing module 702 is further configured to stop, according to the deactivation information, measuring the first spectrum.

Optionally, if the control information includes the configuration information and the activation information, the transceiving module 701 is further configured to: before receiving the activation information, receive a first receiving threshold sent by the first network device; and the transceiving module 701 is specifically configured to receive the activation information when a difference between a strength of a received signal transmitted by the first network device and a strength of a signal that is transmitted by another network device and received on the first spectrum is less than the first receiving threshold.

Optionally, if the control information includes the configuration information, the transceiving module 701 is further configured to: before receiving the configuration information, receive a second receiving threshold sent by the first network device; and the transceiving module 701 is specifically configured to receive the configuration information when a difference between a strength of a received signal transmitted by the first network device and a strength of a signal that is transmitted by another network device and received on the first spectrum is less than the second receiving threshold.

Optionally, the transceiving module 701 is further configured to determine that the control information is identified by using a first identifier of the terminal, where the first identifier is used to indicate, to the terminal, that the control information is sent to the terminal, and instruct the terminal to measure the first spectrum, so that the first network device determines whether the first spectrum is available.

Optionally, if the control information includes the configuration information and the activation information, the transceiving module 701 is specifically configured to receive the activation information on a physical downlink control channel, descramble cyclic redundancy check CRC of the activation information by using the first identifier of the terminal, and if descrambling is successful, determine that the activation information is identified by using the first identifier of the terminal.

Optionally, if the control information includes the configuration information, the transceiving module 701 is specifically configured to receive the configuration information on a physical downlink control channel, descramble CRC of the configuration information by using the first identifier of the terminal, and if descrambling is successful, determine that the configuration information is identified by using the first identifier of the terminal.

Optionally, the configuration information includes first spectrum information that is used to indicate the first spectrum; and the processing module 702 is specifically configured to measure the first spectrum indicated by the first spectrum information, so as to obtain the feedback information.

Optionally, the configuration information includes:

feedback resource indication information that is used to indicate a spectrum resource used by the terminal for reporting the feedback information; and the transceiving module 701 is specifically configured to report the feedback information on the spectrum resource indicated by the feedback resource indication information.

Optionally, the configuration information includes a network device identifier of another network device that uses the first spectrum; and the processing module 702 is specifically configured to measure a signal transmitted on the first spectrum by the another network device identified by the network device identifier, so as to obtain the feedback information.

Optionally, the feedback information includes:

a measurement result obtained by the processing module 702 by measuring the first spectrum.

Optionally, the feedback information includes first indication information that is used to indicate whether the first spectrum is available; and the processing module 702 is specifically configured to measure the first spectrum according to the configuration information, and determine the first indication information according to a measurement result obtained in the measurement.

Optionally, the control information further includes a first measurement threshold; and the processing module 702 is specifically configured to measure the first spectrum according to the configuration information, and determine the first indication information according to the first measurement threshold and the measurement result that is obtained in the measurement.

Optionally, the control information is specifically used for instructing the terminal to measure the first spectrum and a second spectrum that is being used by the first network device; and the configuration information further includes measurement configuration information required by the processing module 702 for measuring the second spectrum; and the processing module 702 is specifically configured to measure the first spectrum and the second spectrum according to the configuration information, so as to obtain the feedback information, where the second spectrum is a licensed spectrum for the first network device.

Optionally, the configuration information includes second spectrum information that is used to indicate the second spectrum; and the processing module 702 is specifically configured to measure the first spectrum and the second spectrum that is indicated by the second spectrum information, so as to obtain the feedback information.

Optionally, the feedback information includes:

a first measurement result and a second measurement result, where the first measurement result is a measurement result obtained by the processing module 702 by measuring the first spectrum, and the second measurement result is a measurement result obtained by the processing module 702 by measuring the second spectrum.

Optionally, the feedback information further includes:

second indication information that is used to indicate that the first measurement result is for the first spectrum; and/or third indication information that is used to indicate that the second measurement result is for the second spectrum.

Optionally, the feedback information includes:

a result of comparing a first measurement result and a second measurement result, where the first measurement result is a measurement result obtained by the processing module 702 by measuring the first spectrum, and the second measurement result is a measurement result obtained by the processing module 702 by measuring the second spectrum.

Optionally, the feedback information further includes:

fourth indication information that is used to indicate that the feedback information includes the comparison result.

Optionally, the feedback information includes:

fifth indication information that is used to indicate whether the first spectrum is available, where the fifth indication information is determined by the processing module 702 according to a first measurement result and a second measurement result, the first measurement result is a measurement result obtained by the processing module 702 by measuring the first spectrum, and the second measurement result is a measurement result obtained by the processing module 702 by measuring the second spectrum.

Optionally, the configuration information further includes a second measurement threshold; and the fifth indication information is determined by the processing module 702 according to the second measurement threshold, the first measurement result, and the second measurement result.

Optionally, the measurement result includes one of the following information:

received signal strength information;

received signal energy information; or received signal quality information.

Optionally, the feedback information includes:

time information that is used to indicate available time of the first spectrum.

Optionally, the time information includes: a start moment T1 when the first spectrum becomes available, available duration D1 that starts from the start moment T1 and during which the first spectrum is available, and unavailable duration D2 that starts at the end of the available duration D1 and during which the first spectrum is unavailable; and the first network device is instructed to determine:

the first spectrum is available since the start moment T1 and during the duration D1 at a period of D1+D2, and the first spectrum is unavailable during the duration D2 after the duration D1.

Optionally, the feedback information includes:

frequency information that is used to indicate an available frequency of the first spectrum.

Optionally, the frequency information includes:

a carrier identifier of an available carrier in the first spectrum; or a carrier bitmap, where the carrier bitmap is used to indicate whether carriers in the first spectrum are available.

Optionally, the transceiving module 701 is specifically configured to:

report the obtained feedback information to the first network device on a physical uplink control channel or a physical uplink shared channel.

Figure 8:
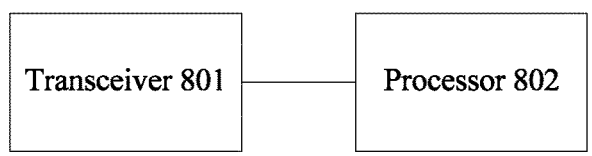
FIG. 8 is a schematic structural diagram of another terminal according to an embodiment of the present invention.

FIG. 8 is a schematic structural diagram of a second type of terminal according to an embodiment of the present invention. As shown in FIG. 8, the terminal includes:

a transceiver 801, configured to receive control information sent by a first network device, where the control information is used for instructing the terminal to measure a first spectrum; and a processor 802, configured to measure the first spectrum according to the control information, so as to obtain feedback information.

The transceiver 801 is further configured to report the obtained feedback information to the first network device, where the feedback information is used for instructing the first network device to determine, according to the feedback information, whether the first spectrum is available.

The first spectrum is an unlicensed spectrum for the first network device.

Optionally, optionally, the control information includes configuration information and activation information, the configuration information includes measurement configuration information required by the terminal for measuring the first spectrum, and the activation information is used for instructing the terminal to perform measurement according to the configuration information; the transceiver 801 is specifically configured to: after receiving the configuration information sent by the first network device, receive the activation information sent by the first network device; and the processor 802 is specifically configured to measure the first spectrum according to the configuration information after receiving the activation information; or the control information includes the configuration information; the transceiver 801 is specifically configured to receive the configuration information sent by the first network device; and the processor 802 is specifically configured to measure the first spectrum according to the configuration information after receiving the configuration information.

Optionally, the transceiver 801 is further configured to determine that the control information is identified by using a first identifier of the terminal, where the first identifier is used to indicate, to the terminal, that the control information is sent to the terminal, and instruct the terminal to measure the first spectrum, so that the first network device determines whether the first spectrum is available.

Optionally, if the control information includes the configuration information and the activation information, the transceiver 801 is specifically configured to receive the activation information on a physical downlink control channel, descramble cyclic redundancy check CRC of the activation information by using the first identifier of the terminal, and if descrambling is successful, determine that the activation information is identified by using the first identifier of the terminal.

Optionally, if the control information includes the configuration information, the transceiver 801 is specifically configured to receive the configuration information on a physical downlink control channel, descramble CRC of the configuration information by using the first identifier of the terminal, and if descrambling is successful, determine that the configuration information is identified by using the first identifier of the terminal.

Figure 9:
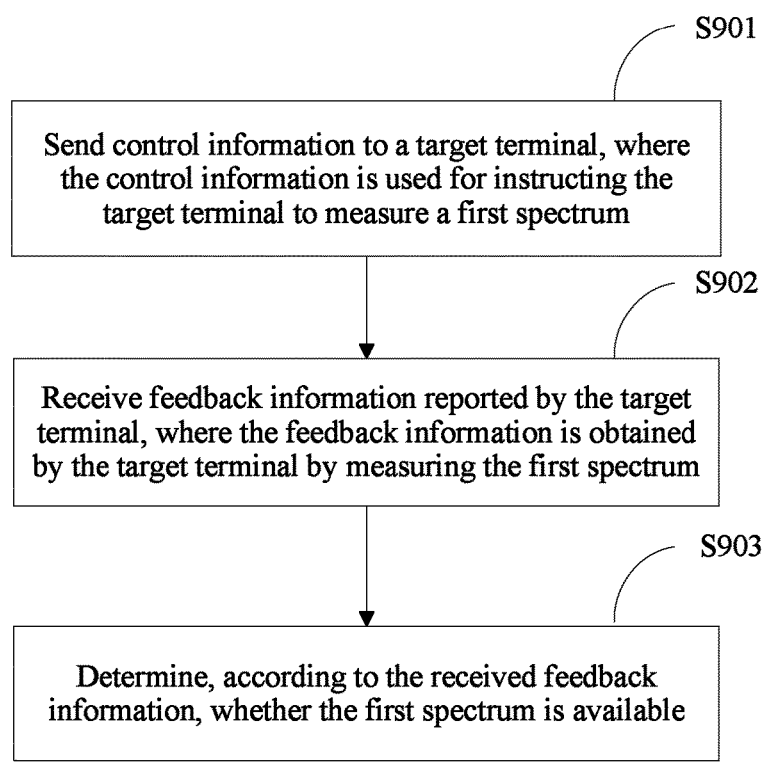
FIG. 9 is a flowchart of a method for determining availability of a spectrum according to an embodiment of the present invention.

FIG. 9 is a flowchart of a first method for determining availability of a spectrum according to an embodiment of the present invention. As shown in FIG. 9, the method includes:

S901: Send control information to a target terminal, where the control information is used for instructing the target terminal to measure a first spectrum.

The first spectrum is an unlicensed spectrum for a current network device.

S902: Receive feedback information reported by the target terminal, where the feedback information is obtained by the target terminal by measuring the first spectrum.

S903: Determine, according to the received feedback information, whether the first spectrum is available.

Optionally, the control information includes configuration information and activation information, the configuration information includes measurement configuration information required by the target terminal for measuring the first spectrum, and the activation information is used for instructing the target terminal to perform measurement according to the configuration information; and the sending control information to a target terminal includes: after sending the configuration information to the target terminal, sending the activation information to the target terminal when the target terminal is required to measure the first spectrum; or the control information includes the configuration information; and the sending control information to a target terminal includes: sending the configuration information to the target terminal when the target terminal is required to measure the first spectrum, so as to instruct the target terminal to perform measurement according to the configuration information.

Optionally, the configuration information further includes feedback information reporting condition information: the feedback information reporting condition information is used for instructing the target terminal to report the feedback information when a condition indicated by the feedback information reporting condition information is met.

Optionally, if the control information includes the configuration information and the activation information, after the sending the activation information, the method further includes:

sending deactivation information to the target terminal when the target terminal is required to stop measuring the first spectrum, so as to instruct the target terminal to stop measuring the first spectrum.

Optionally, if the control information includes the configuration information and the activation information, before the sending the activation information, the method further includes:

sending a first receiving threshold to the target terminal, where the first receiving threshold is used for instructing the target terminal to receive the activation information when the following condition is met:

a difference between a strength of a received signal transmitted by the current network device and a strength of a signal that is transmitted by another network device and received on the first spectrum is less than the first receiving threshold.

Optionally, if the control information includes the configuration information, before the sending the configuration information, the method further includes:

sending a second receiving threshold to the target terminal, where the second receiving threshold is used for instructing the target terminal to receive the configuration information when the following condition is met:

a difference between a strength of a received signal transmitted by the current network device and a strength of a signal that is transmitted by another network device and received on the first spectrum is less than the second receiving threshold.

Optionally, the method further includes:

identifying the control information by using a first identifier of the target terminal, where the first identifier is used to indicate, to the target terminal, that the control information is sent to the target terminal, and instruct the target terminal to measure the first spectrum, so that the current network device determines whether the first spectrum is available.

Optionally, if the control information includes the configuration information and the activation information, the sending the activation information to the target terminal includes: sending the activation information on a physical downlink control channel; and the identifying the control information by using a first identifier of the target terminal includes:

scrambling cyclic redundancy check CRC information of the activation information by using the first identifier of the target terminal.

Optionally, if the control information includes the configuration information, the sending the configuration information to the target terminal includes: sending the configuration information on a physical downlink control channel; and the identifying the control information by using a first identifier of the target terminal includes:

scrambling CRC information of the configuration information by using the first identifier of the target terminal.

Optionally, the configuration information includes:

first spectrum information that is used to indicate the first spectrum, so as to indicate the first spectrum to be measured by the target terminal.

Optionally, the configuration information includes:

feedback resource indication information that is used to indicate a spectrum resource used by the target terminal for reporting the feedback information.

Optionally, the configuration information includes a network device identifier of another network device that uses the first spectrum; and the control information is specifically used for instructing the target terminal to measure a signal transmitted on the first spectrum by the another network device identified by the network device identifier.

Optionally, the feedback information includes:

a measurement result obtained by the target terminal by measuring the first spectrum.

Optionally, the feedback information includes:

first indication information that is used to indicate whether the first spectrum is available, where the first indication information is determined by the target terminal according to a measurement result obtained by measuring the first spectrum.

Optionally, the configuration information further includes a first measurement threshold; and the first indication information is determined by the target terminal according to the first measurement threshold and the measurement result that is obtained by the target terminal by measuring the first spectrum.

Optionally, the control information is specifically used for instructing the target terminal to measure the first spectrum and a second spectrum that is being used by the current network device; and the configuration information further includes measurement configuration information required by the target terminal for measuring the second spectrum, where the second spectrum is a licensed spectrum for the current network device.

Optionally, the configuration information includes:

second spectrum information that is used to indicate the second spectrum, so as to indicate the second spectrum to be measured by the target terminal.

Optionally, the feedback information includes:

a first measurement result and a second measurement result, where the first measurement result is a measurement result obtained by the target terminal by measuring the first spectrum, and the second measurement result is a measurement result obtained by the target terminal by measuring the second spectrum.

Optionally, the feedback information further includes second indication information that is used to indicate that the first measurement result is for the first spectrum; and the determining, according to the received feedback information, whether the first spectrum is available includes:

determining the first measurement result and/or the second measurement result from the feedback information according to the second indication information; and determining, according to the first measurement result and the second measurement result, whether the first spectrum is available.

Optionally, the feedback information further includes third indication information that is used to indicate that the second measurement result is for the second spectrum; and the determining, according to the received feedback information, whether the first spectrum is available includes:

determining the second measurement result and/or the first measurement result from the feedback information according to the third indication information; and determining, according to the first measurement result and the second measurement result, whether the first spectrum is available.

Optionally, the feedback information includes:

a result of comparing a first measurement result and a second measurement result, where the first measurement result is a measurement result obtained by the target terminal by measuring the first spectrum, and the second measurement result is a measurement result obtained by the target terminal by measuring the second spectrum.

Optionally, the feedback information further includes:

fourth indication information that is used to indicate that the feedback information includes the comparison result; and the determining, according to the received feedback information, whether the first spectrum is available includes:

determining, according to the fourth indication information, that the feedback information includes the comparison result; and determining, according to the comparison result, whether the first spectrum is available.

Optionally, the feedback information includes:

fifth indication information that is used to indicate whether the first spectrum is available, where the fifth indication information is determined by the target terminal according to a first measurement result and a second measurement result, the first measurement result is a measurement result obtained by the target terminal by measuring the first spectrum, and the second measurement result is a measurement result obtained by the target terminal by measuring the second spectrum.

Optionally, the configuration information further includes a second measurement threshold; and the fifth indication information is determined by the target terminal according to the second measurement threshold, the first measurement result, and the second measurement result.

Optionally, the measurement result includes one of the following information:

received signal strength information;

received signal energy information; or received signal quality information.

Optionally, the feedback information includes:

time information that is used to indicate available time of the first spectrum.

Optionally, the time information includes:

a start moment T1 when the first spectrum becomes available, available duration D1 that starts from the start moment T1 and during which the first spectrum is available, and unavailable duration D2 that starts at the end of the available duration D1 and during which the first spectrum is unavailable; and the determining, according to the received feedback information, whether the first spectrum is available includes:

determining that the first spectrum is available since the start moment T1 and during the duration D1 at a period of D1+D2, and the first spectrum is unavailable during the duration D2 after the duration D1.

Optionally, the feedback information includes:

frequency information that is used to indicate an available frequency of the first spectrum.

Optionally, the frequency information includes:

a carrier identifier of an available carrier in the first spectrum; or a carrier bitmap, where the carrier bitmap is used to indicate whether carriers in the first spectrum are available.

Optionally, the receiving feedback information reported by the target terminal includes:

receiving the feedback information from a physical uplink control channel or a physical uplink shared channel.

Figure 10:
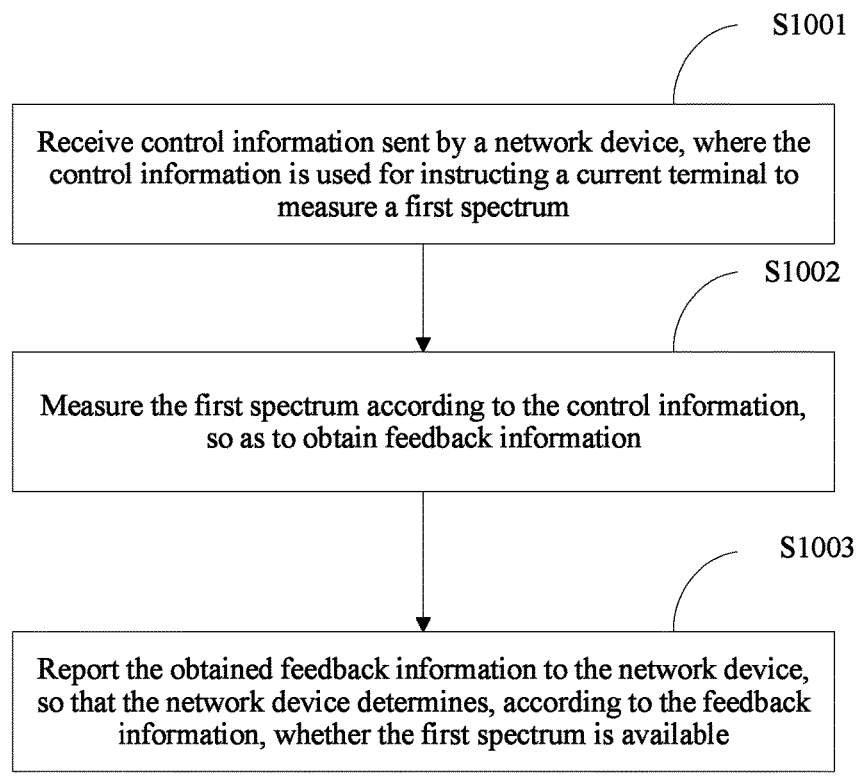
FIG. 10 is a flowchart of another method for determining availability of a spectrum according to an embodiment of the present invention.

FIG. 10 is a flowchart of a second method for determining availability of a spectrum according to an embodiment of the present invention. As shown in FIG. 10, the method includes the following steps:

S1001: Receive control information sent by a network device, where the control information is used for instructing a current terminal to measure a first spectrum.

S1002: Measure the first spectrum according to the control information, so as to obtain feedback information.

S1003: Report the obtained feedback information to the network device, where the feedback information is used for instructing the network device to determine, according to the feedback information, whether the first spectrum is available.

The first spectrum is an unlicensed spectrum for the network device.

Optionally, the control information includes configuration information and activation information, the configuration information includes measurement configuration information required by the current terminal for measuring the first spectrum, and the activation information is used for instructing the current terminal to perform measurement according to the configuration information; the receiving control information sent by a network device, and measuring the first spectrum according to the control information include: after receiving the configuration information sent by the network device, receiving the activation information sent by the network device; and measuring the first spectrum according to the configuration information after receiving the activation information; or the control information includes the configuration information; the receiving control information sent by a network device, and measuring the first spectrum according to the control information include: receiving the configuration information sent by the network device; and measuring the first spectrum according to the configuration information after receiving the configuration information.

Optionally, the configuration information further includes feedback information reporting condition information; and the reporting the obtained feedback information to the network device includes: reporting the feedback information when a condition indicated by the feedback information reporting condition information is met.

Optionally, if the control information includes the configuration information and the activation information, after the receiving the activation information sent by the network device, the method further includes:

receiving deactivation information sent by the network device; and stopping, according to the deactivation information, measuring the first spectrum.

Optionally, if the control information includes the configuration information and the activation information, before the receiving the activation information, the method further includes receiving a first receiving threshold sent by the network device; and the receiving the activation information includes: receiving the activation information when a difference between a strength of a received signal transmitted by the network device and a strength of a signal that is transmitted by another network device and received on the first spectrum is less than the first receiving threshold.

Optionally, if the control information includes the configuration information, before the receiving the configuration information, the method further includes receiving a second receiving threshold sent by the network device; and the receiving the configuration information includes: receiving the configuration information when a difference between a strength of a received signal transmitted by the current network device and a strength of a signal that is transmitted by another network device and received on the first spectrum is less than the second receiving threshold.

Optionally, after the receiving control information and before the measuring the first spectrum, the method further includes:

determining that the control information is identified by using a first identifier of the current terminal, where the first identifier is used to indicate, to the current terminal, that the control information is sent to the current terminal, and instruct the current terminal to measure the first spectrum, so that the network device determines whether the first spectrum is available.

Optionally, if the control information includes the configuration information and the activation information, the receiving the activation information includes receiving the activation information on a physical downlink control channel; and the determining that the control information is identified by using a first identifier of the current terminal includes:

descrambling cyclic redundancy check CRC of the activation information by using the first identifier of the current terminal, and if descrambling is successful, determining that the activation information is identified by using the first identifier of the current terminal.

Optionally, if the control information includes the configuration information, the receiving the configuration information includes receiving the configuration information on a physical downlink control channel; and the determining that the control information is identified by using a first identifier of the current terminal includes:

descrambling CRC of the configuration information by using the first identifier of the current terminal, and if descrambling is successful, determining that the configuration information is identified by using the first identifier of the current terminal.

Optionally, the configuration information includes first spectrum information that is used to indicate the first spectrum; and the measuring the first spectrum according to the configuration information, so as to obtain feedback information includes: measuring the first spectrum indicated by the first spectrum information, so as to obtain the feedback information.

Optionally, the configuration information includes:

feedback resource indication information that is used to indicate a spectrum resource used by the current terminal for reporting the feedback information; and the reporting the obtained feedback information to the network device includes: reporting the feedback information on the spectrum resource indicated by the feedback resource indication information.

Optionally, the configuration information includes a network device identifier of another network device that uses the first spectrum; and the measuring the first spectrum according to the control information, so as to obtain feedback information includes: measuring a signal transmitted on the first spectrum by the another network device identified by the network device identifier, so as to obtain the feedback information.

Optionally, the feedback information includes a measurement result obtained by measuring the first spectrum.

Optionally, the feedback information includes first indication information that is used to indicate whether the first spectrum is available; and the measuring the first spectrum according to the control information, so as to obtain feedback information includes:

measuring the first spectrum according to the configuration information; and determining the first indication information according to a measurement result obtained in the measurement.

Optionally, the control information further includes a first measurement threshold; and the measuring the first spectrum according to the control information, so as to obtain feedback information includes:

measuring the first spectrum according to the configuration information; and determining the first indication information according to the first measurement threshold and the measurement result that is obtained in the measurement.

Optionally, the control information is specifically used for instructing the current terminal to measure the first spectrum and a second spectrum that is being used by the network device; and the configuration information further includes measurement configuration information required by the current terminal for measuring the second spectrum, where the measuring the first spectrum according to the control information, so as to obtain feedback information includes:

measuring the first spectrum and the second spectrum according to the configuration information, so as to obtain the feedback information, where the second spectrum is a licensed spectrum for the network device.

Optionally, the configuration information includes second spectrum information that is used to indicate the second spectrum; and the measuring the first spectrum and the second spectrum according to the configuration information, so as to obtain feedback information includes: measuring the first spectrum and the second spectrum that is indicated by the second spectrum information, so as to obtain the feedback information.

Optionally, the feedback information includes:

a first measurement result and a second measurement result, where the first measurement result is a measurement result obtained by the current terminal by measuring the first spectrum, and the second measurement result is a measurement result obtained by the current terminal by measuring the second spectrum.

Optionally, the feedback information further includes:

second indication information that is used to indicate that the first measurement result is for the first spectrum; and/or third indication information that is used to indicate that the second measurement result is for the second spectrum.

Optionally, the feedback information includes:

a result of comparing a first measurement result and a second measurement result, where the first measurement result is a measurement result obtained by the current terminal by measuring the first spectrum, and the second measurement result is a measurement result obtained by the current terminal by measuring the second spectrum.

Optionally, the feedback information further includes:

fourth indication information that is used to indicate that the feedback information includes the comparison result.

Optionally, the feedback information includes:

fifth indication information that is used to indicate whether the first spectrum is available, where the fifth indication information is determined by the current terminal according to a first measurement result and a second measurement result, the first measurement result is a measurement result obtained by the current terminal by measuring the first spectrum, and the second measurement result is a measurement result obtained by the current terminal by measuring the second spectrum.

Optionally, the configuration information further includes a second measurement threshold; and the fifth indication information is determined by the current terminal according to the second measurement threshold, the first measurement result, and the second measurement result.

Optionally, the measurement result includes one of the following information:

received signal strength information;

received signal energy information; or received signal quality information.

Optionally, the feedback information includes:

time information that is used to indicate available time of the first spectrum.

Optionally, the time information includes: a start moment T1 when the first spectrum becomes available, available duration D1 that starts from the start moment T1 and during which the first spectrum is available, and unavailable duration D2 that starts at the end of the available duration D1 and during which the first spectrum is unavailable; and the network device is instructed to determine:

the first spectrum is available since the start moment T1 and during the duration D1 at a period of D1+D2, and the first spectrum is unavailable during the duration D2 after the duration D1.

Optionally, the feedback information includes:

frequency information that is used to indicate an available frequency of the first spectrum.

Optionally, the frequency information includes:

a carrier identifier of an available carrier in the first spectrum; or a carrier bitmap, where the carrier bitmap is used to indicate whether carriers in the first spectrum are available.

Optionally, the reporting the obtained feedback information to the network device includes:

reporting the obtained feedback information to the network device on a physical uplink control channel or a physical uplink shared channel.

In conclusion, in the embodiments of the present invention, a network device instructs a terminal to measure an unlicensed first spectrum. The network device receives feedback information reported by the terminal, and the feedback information is obtained by the terminal by measuring the first spectrum. The network device determines, according to the received feedback information, whether the first spectrum is available. By measuring the unlicensed first spectrum, the terminal may more accurately determine whether another network device is using the unlicensed first spectrum, so as to effectively avoid interference from the another network device.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, a person skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A first network device, comprising:
a transceiver configured to:
send a control information to a target terminal, wherein the control information is used for instructing the target terminal to measure a first spectrum, and the first spectrum is an unlicensed spectrum for the first network device; and
receive a feedback information reported by the target terminal, wherein the feedback information is obtained by the target terminal by measuring the first spectrum; and
a processor configured to determine, according to the feedback information received by the transceiver, whether the first spectrum is free;
wherein the control information comprises a configuration information and activation information,
wherein the configuration information comprises measurement configuration information required by the target terminal for measuring the first spectrum,
wherein the activation information is sent by the first network device to the target terminal to activate the target terminal to perform a measurement of the first spectrum according to the configuration information,
wherein the transceiver is configured to send, after previously sending the configuration information to the target terminal, the activation information to the target terminal at a time when the first network device needs the target terminal to perform the measurement of the first spectrum,
wherein the feedback information comprises a first measurement result obtained by the target terminal by measuring the first spectrum, and
wherein the first measurement result comprises: a received signal strength information; received signal energy information; or received signal quality information.

2. The first network device according to claim 1, wherein the configuration information comprises:
first spectrum information that is used to indicate the first spectrum to be measured by the target terminal.

3. The first network device according to claim 1, wherein:
the configuration information further comprises measurement duration information, the measurement duration information is used to indicate duration of measuring the first spectrum by the target terminal.

4. The first network device according to claim 1, wherein the configuration information further comprises:
second spectrum information that is used to indicate a second spectrum to be measured by the target terminal; and
measurement duration information that is used to indicate a duration of measuring the second spectrum by the target terminal, where the second spectrum is a spectrum that is being used by the first network device.

5. The first network device according to claim 4, wherein the feedback information further comprises a second measurement result obtained by measuring the second spectrum.

6. The first network device according to claim 1, wherein the feedback information further comprises time information that is used to indicate available time of the first spectrum,
wherein the time information comprises:
a start moment T1 when the first spectrum becomes available,
an available duration D1 that starts at the start moment T1 and during which the first spectrum is available, and
an unavailable duration D2 that starts at the end of the available duration D1 and during which the first spectrum is unavailable; and
wherein the processor is configured to:
determine that the first spectrum is available since the start moment T1 and during the duration D1 at a period of D1+D2, and the first spectrum is unavailable during the duration D2 after the duration D1.

7. A terminal, comprising:
a transceiver configured to receive a control information sent by a first network device, wherein the control information is used for instructing the terminal to measure a first spectrum; and
a processor configured to measure the first spectrum according to the control information, so as to obtain a feedback information;
wherein the transceiver is further configured to report the feedback information to the first network device,
wherein the feedback information is used for instructing the first network device to determine, according to the feedback information, whether the first spectrum is free,
wherein the first spectrum is an unlicensed spectrum for the first network device;
wherein the control information comprises a configuration information and activation information,
wherein the configuration information comprises measurement configuration information required by the terminal for measuring the first spectrum,
wherein the activation information is sent by the first network device to the terminal to activate the target terminal to perform a measurement of the first spectrum according to the configuration information;
wherein the transceiver is configured to receive, after previously receiving the configuration information sent by the first network device, the activation information sent by the first network device at a time when the first network device needs the terminal to perform the measurement of the first spectrum,
wherein the processor is configured to measure the first spectrum according to the configuration information after receiving the activation information,
wherein the feedback information comprises a first measurement result obtained by the processing module by measuring the first spectrum, and
wherein the first measurement result comprises: a received signal strength information; received signal energy information; or received signal quality information.

8. The terminal according to claim 7, wherein:
the configuration information comprises first spectrum information that is used to indicate the first spectrum; and
the processor is specifically configured to measure the first spectrum indicated by the first spectrum information, so as to obtain the feedback information.

9. The terminal according to claim 7, wherein:
the configuration information further comprises measurement duration information, the measurement duration information is used to indicate duration of measuring the first spectrum by the terminal.

10. The terminal according to claim 7, wherein the configuration information further comprises:
second spectrum information that is used to indicate a second spectrum to be measured by the terminal; and
measurement duration information that is used to indicate a duration of measuring the second spectrum by the terminal, where the second spectrum is a spectrum that is being used by the first network device.

11. The terminal according to claim 10, wherein the feedback information further comprises a second measurement result obtained by measuring the second spectrum.

12. The terminal according to claim 7, wherein the feedback information further comprises time information that is used to indicate available time of the first spectrum,
wherein the time information comprises:
a start moment T1 when the first spectrum becomes available,
an available duration D1 that starts at the start moment T1 and during which the first spectrum is available, and
an unavailable duration D2 that starts at the end of the available duration D1 and during which the first spectrum is unavailable; and
wherein the processor is configured to:
determine that the first spectrum is available since the start moment T1 and during the duration D1 at a period of D1+D2, and the first spectrum is unavailable during the duration D2 after the duration D1.

13. A method performed by a first network device for determining availability of a communication spectrum, the method comprising:
sending a control information to a target terminal, wherein the control information is used for instructing the target terminal to measure a first spectrum, wherein the first spectrum is an unlicensed spectrum for a current network device;
receiving a feedback information reported by the target terminal, wherein the feedback information is obtained by the target terminal by measuring the first spectrum; and
determining, according to the received feedback information, whether the first spectrum is free wherein the control information comprises a configuration information and activation information,
wherein the configuration information comprises measurement configuration information required by the target terminal for measuring the first spectrum,
wherein the activation information is sent by the first network device to the target terminal to activate the target terminal to perform a measurement of the first spectrum according to the configuration information,
wherein the sending the control information to the target terminal comprises sending, after previously sending the configuration information to the target terminal, the activation information to the target terminal at a time when the first network device needs the target terminal to perform the measurement of the first spectrum,
wherein the feedback information comprises a first measurement result obtained by the target terminal by measuring the first spectrum, and
wherein the first measurement result comprises: a received signal strength information; received signal energy information; or received signal quality information.

14. The method according to claim 13, wherein the configuration information comprises:
first spectrum information that is used to indicate the first spectrum, so as to indicate the first spectrum to be measured by the target terminal.

15. The method according to claim 13, wherein:
the configuration information further comprises measurement duration information, the measurement duration information is used to indicate duration of measuring the first spectrum by the target terminal.

16. The method according to claim 13, wherein the configuration information further comprises:
second spectrum information that is used to indicate a second spectrum to be measured by the target terminal; and
measurement duration information that is used to indicate a duration of measuring the second spectrum by the target terminal, where the second spectrum is a spectrum that is being used by the current network device.

17. The first network device according to claim 16, wherein the feedback information further comprises a second measurement result obtained by measuring the second spectrum.

18. The method according to claim 13, wherein the feedback information further comprises time information that is used to indicate available time of the first spectrum, wherein the time information comprises:
a start moment T1 when the first spectrum becomes available,
an available duration D1 that starts at the start moment T1 and during which the first spectrum is available, and
an unavailable duration D2 that starts at the end of the available duration D1 and during which the first spectrum is unavailable; and
wherein the processor is configured to:
determine that the first spectrum is available since the start moment T1 and during the duration D1 at a period of D1+D2, and the first spectrum is unavailable during the duration D2 after the duration D1.

19. A method performed by a current terminal for determining availability of a communication spectrum, the method comprising:

receiving a control information sent by a network device, wherein the control information is used for instructing the current terminal to measure a first spectrum;
measuring the first spectrum according to the control information, so as to obtain a feedback information; and
reporting the feedback information to the network device, wherein the feedback information is used for instructing the network device to determine, according to the feedback information, whether the first spectrum is free,
wherein the first spectrum is an unlicensed spectrum for the network device;
wherein the control information comprises a configuration information and activation information,
wherein the configuration information comprises measurement configuration information required by the current terminal for measuring the first spectrum,
wherein the activation information is sent by the network device to the current terminal to activate the target terminal to perform measurement of the first spectrum according to the configuration information,
wherein the receiving the control information sent by the network device and measuring the first spectrum according to the control information comprise:
receiving, after previously receiving the configuration information sent by the network device, the activation information sent by the network device at a time when the network device needs the current terminal to perform the measurement of the first spectrum; and
measuring the first spectrum according to the configuration information after receiving the activation information,
activation
wherein the feedback information comprises a first measurement result obtained by measuring the first spectrum, and
wherein the first measurement result comprises: a received signal strength information; received signal energy information; or received signal quality information.

20. The method according to claim 19, wherein:
the configuration information comprises first spectrum information that is used to indicate the first spectrum to be measured by the current terminal; and
the measuring the first spectrum according to the configuration information comprises: measuring the first spectrum indicated by the first spectrum information, so as to obtain the feedback information.

21. The method according to claim 19, wherein:
the configuration information further comprises measurement duration information, the measurement duration information is used to indicate duration of measuring the first spectrum by the current terminal.

22. The method according to claim 19, wherein the configuration information further comprises:
second spectrum information that is used to indicate a second spectrum to be measured by the current terminal; and
measurement duration information that is used to indicate a duration of measuring the second spectrum by the current terminal, where the second spectrum is a spectrum that is being used by the network device.

23. The method according to claim 22, wherein the feedback information further comprises a second measurement result obtained by measuring the second spectrum.

24. The method according to claim 19, wherein the feedback information further comprises time information that is used to indicate available time of the first spectrum, wherein the time information comprises:
- a start moment T1 when the first spectrum becomes available,
- an available duration D1 that starts at the start moment T1 and during which the first spectrum is available, and
- an unavailable duration D2 that starts at the end of the available duration D1 and during which the first spectrum is unavailable; and wherein the processor is configured to:
- determine that the first spectrum is available since the start moment T1 and during the duration D1 at a period of D1+D2, and the first spectrum is unavailable during the duration D2 after the duration D1.

* * * * *